US008298658B2

(12) United States Patent
Shimamura et al.

(10) Patent No.: US 8,298,658 B2
(45) Date of Patent: Oct. 30, 2012

(54) DEVELOPER CARRYING MEMBER AND DEVELOPING ASSEMBLY

(75) Inventors: Masayoshi Shimamura, Yokohama (JP); Yasuhide Goseki, Yokohama (JP); Yasutaka Akashi, Tokyo (JP); Kazunori Saiki, Yokohama (JP); Satoshi Otake, Numazu (JP); Nene Dojo, Numazu (JP); Minoru Ito, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 1041 days.

(21) Appl. No.: 11/583,855

(22) Filed: Oct. 20, 2006

(65) Prior Publication Data

US 2007/0036968 A1 Feb. 15, 2007

Related U.S. Application Data

(63) Continuation of application No. PCT/JP2006/314930, filed on Jul. 21, 2006.

(30) Foreign Application Priority Data

Jul. 21, 2005 (JP) ................................ 2005-211658
Jul. 21, 2005 (JP) ................................ 2005-211681

(51) Int. Cl.
*B32B 5/16* (2006.01)

(52) U.S. Cl. ..... 428/323; 428/325; 428/332; 428/908.8; 428/909; 501/1

(58) Field of Classification Search .................. 428/323, 428/325, 332, 908.8, 909; 501/1
See application file for complete search history.

(56) References Cited

U.S. PATENT DOCUMENTS 5,434,653 A 7/1995 Takizawa et al.
5,860,050 A 1/1999 Shimamura et al.
5,998,008 A 12/1999 Shimamura et al.

(Continued)

FOREIGN PATENT DOCUMENTS

EP 1 528 440 A2 5/2005

(Continued)

OTHER PUBLICATIONS

"Introduction to the Internet website of Lion Corporation"; Sep. 21, 2002 on Internet URL: hhp://www.lion.co.jp/chem/jn/sectop/carbon/kintro.html.

(Continued)

*Primary Examiner* — Betelhem Shewareged
(74) *Attorney, Agent, or Firm* — Fitzpatrick, Cella, Harper & Scinto

(57) ABSTRACT

A developer carrying member is provided which, even in continuous copying over a long term and also even under different environmental conditions, do not cause any charge-up of toner, and prevent the toner from melt-adherent to the developer carrying member surface and developer layer thickness control member surface to maintain the state of uniform coating of a developer having a toner and to make the toner uniformly and quickly triboelectrically charged, so as to obtain high-grade images free of any image density decrease, image density non-uniformity, sleeve ghosts, fog and vertical streaks during running service. Provided are a developer carrying member having a substrate and a resin coat layer on the surface of the substrate, which resin coat layer contains at least a binder resin and a carbon black, where the graphite (002) plane obtained from X-ray diffraction of the carbon black has a lattice spacing of from 0.3370 nm or more to 0.3450 nm or less; and a developing assembly having such a developer carrying member.

7 Claims, 5 Drawing Sheets

U.S. PATENT DOCUMENTS

| | | | | |
|---|---|---|---|---|
| 2003/0232185 | A1 | 12/2003 | Shimamura et al. | 428/323 |
| 2004/0106509 | A1 * | 6/2004 | Ochiai et al. | 501/99 |
| 2005/0095038 | A1 * | 5/2005 | Okamoto et al. | 399/276 |
| 2006/0275598 | A1 | 12/2006 | Shimamura et al. | |
| 2008/0095038 | A1 | 4/2008 | Chang et al. | 370/208 |
| 2010/0166454 | A1 * | 7/2010 | Taniguchi et al. | 399/111 |

FOREIGN PATENT DOCUMENTS

| | | | |
|---|---|---|---|
| JP | 7-13415 | A | 1/1995 |
| JP | 7-261542 | A | 10/1995 |
| JP | 8-240981 | A | 9/1996 |
| JP | 2001-331032 | A | 11/2001 |
| JP | 2003-323039 | | 11/2003 |
| JP | 2003-323040 | | 11/2003 |
| KR | 20050041855 | A | 5/2005 |

OTHER PUBLICATIONS

"Properties and Optimum Formulation of Carbon Black and its Application Techniques"; p. 284, Published by K.K. Gijutu Joho Kyokai; May 26, 1997.

Korean Office Action issued in the counterpart application No. 10-2008-7004162, dated Feb. 3, 2010—5 pages.

* cited by examiner

DEVELOPER CARRYING MEMBER AND DEVELOPING ASSEMBLY

This application is a continuation of International Application No. PCT/JP2006/314930, filed Jul. 21, 2006, which claims the benefit of Japanese Patent Application Nos. 2005-211658, filed Jul. 21, 2005 and 2005-211681, filed Jul. 21, 2005.

BACKGROUND OF THE INVENTION

1. Field of the Invention

This invention relates to a developer carrying member used to develop electrostatic latent images formed on an electrostatic latent image bearing member such as an electrophotographic photosensitive member or an electrostatic recording dielectric in electrophotography, and a developing assembly in which such a developer carrying member is set.

2. Description of the Related Art

A number of methods are conventionally known as methods for electrophotography. In general, copies are obtained by forming an electrostatic latent image on an electrostatic latent image bearing member such as a photosensitive member by utilizing a photoconductive material and by various means, subsequently developing the electrostatic latent image by the use of a toner to form a toner image, transferring the toner image to a transfer material such as paper as occasion calls, and thereafter fixing the toner image onto the transfer material by the action of heat and/or pressure.

In recent years, electrophotographic apparatus such as printers and copying machines have been made high-resolution as a trend of techniques. For example, those which hitherto have a resolution of 300 dpi or 600 dpi are being replaced by those having a resolution of 1,200 dpi or 2,400 dpi. Accordingly, developing systems are correspondingly required to achieve a higher minuteness.

In addition, in the field of electrophotography, color image formation is on rapid progress. Color images are formed by development performed by superimposing yellow, magenta, cyan and black four-color toners appropriately, and hence the respective-color toners are sought to have a higher developing performance than those in monochrome image formation. Accordingly, it has become important to control the chargeability of color toners uniformly.

It, however, is difficult to regulate the charging of toners, and various measures are being taken on toners. Nevertheless, especially in the case of one-component developing systems, it is demanded to further improve toners in their charge uniformity and running stability of charging.

In particular, as the developer carrying member such as a developing sleeve is repeatedly rotated, what is called charge-up tends to occur, which is a phenomenon in which the charge quantity of the toner coated on the developing sleeve becomes too high because of contact with the developing sleeve. Once it occurs, the toner is very strongly attracted to the developing sleeve surface to come to stand immobile on the developing sleeve surface to become not movable to the latent images on the photosensitive drum from the developing sleeve. If such a phenomenon of charge-up occurs, the toner can not easily be charged at its upper-layer portion in a toner layer on the developing sleeve surface. For this reason, the toner that participates in development decreases, and hence this tends to cause thin line images and a decrease in image density of solid images. A phenomenon may further come about in which such toner not properly charged because of the phenomenon of charge-up flows out onto the developing sleeve to cause line-shaped, blotchy or wavy non-uniformity.

Toners are recently made to have small particle diameter in order to make electrophotographic apparatus digital and make them achieve much higher image quality, and made to have closely spherical particle shape in order to reduce waste toners.

However, where a toner having been made to have a small particle diameter and made spherical is used, the toner is improved in fluidity, but on the other hand shows a tendency that it is difficult for the toner to be coated on the developing sleeve in a uniform thin layer. Accordingly, in order for such a toner to be uniformly coated on the developing sleeve, it is necessary to enhance toner control power by using a developer layer thickness control member such as a developing blade. Especially in a low-temperature and low-humidity environment, the charge quantity of toner per unit mass tends to increase. Hence, the toner may non-uniformly be charged to tend to cause image density decrease and image density non-uniformity, and also the toner having strongly adhered onto the developing sleeve may grow to melt-adhere thereto to cause faulty images such as fog and vertical streaks.

In a high-temperature and high-humidity environment, because of the use of materials which make the toner readily flowable by physical force and heat in order to improve low-temperature fixing performance, melt adhesion of the toner to the developing sleeve surface and developing blade surface is accelerated as a result of the fact that the toner is repeatedly rubbed between the developing sleeve and the developing blade with repetition of copying and then undergoes a stress. This tends to seriously cause faulty images such as fog, image density non-uniformity and vertical streaks.

Meanwhile, as a method for resolving such a phenomenon, Japanese Patent Application Laid-open No. H08-240981 discloses use of a developing sleeve comprising a metallic substrate and provided thereon with a resin coat layer in which a conductive material or solid lubricant such as carbon black or graphite particles is dispersed.

The use of such a developer carrying member is seen to make the above phenomenon of charge-up vastly less occur, and further to make the toner less melt-adhere to the developing sleeve surface in a high-temperature and high-humidity environment.

However, in the above developer carrying member, the profile of surface unevenness of the resin coat layer is not uniform and also the lubricity of the resin coat layer surface is not sufficiently uniform, and hence it is necessary to more improve charge characteristics by which the toner can uniformly and quickly be charged. Also, in long-term and long-running service, especially where the toner having been made spherical is used, part of the resin coat layer surface stands easily causative of toner melt adhesion because of an influence of non-uniform hills in unevenness of the resin coat layer surface and because of such non-uniform lubricity of the resin coat layer surface. Accordingly, since the toner may come to be non-uniformly triboelectrically charged to cause fog seriously and cause image density non-uniformity, sleeve ghosts and line-shaped image defects, there is room for improvement.

In particular, in the case when the developer carrying member having the resin coat layer in which the solid lubricant such as graphite particles has been dispersed is used, the resin coat layer surface has lubricity due to the scaly structure of graphite, and hence brings out a sufficient effect against sleeve ghosts which may be caused by the charge-up. However, the graphite particles are not easily uniformly be dispersed in the coating resin because of their shape which is scaly and amorphous and the particles have particle diameters as large as 2 to 30 μm and also have a broad particle size distribution. As the result, a resin coat layer which contains only the graphite particles in a large quantity may have a non-uniform surface profile to tend to cause wear and liberation of the graphite particles themselves and any local poor lubricity, at the resin coat layer surface. Hence, where the developer carrying member is used in long running, its resin coat layer may come to wear to change in surface roughness and surface composition and also cause toner contamination, to tend to cause faulty transport of toner and make the toner charged non-uniformly.

A method is also disclosed in which, as a conductive material, specific carbon black having a high electrical conductivity, such as KETJEN BLACK or acetylene black, is used in the resin coat layer of the developer carrying member. For example, Japanese Patent Application Laid-open No. 2001-331032 discloses a developing roller having a resin coat layer which contains KETJEN BLACK. Japanese Patent No. 2795168 also discloses a developing roller having an elastic layer which contains acetylene black.

Carbon black commonly has a small particle diameter and a large specific surface area and its structures stand developed. Hence, it has a high DBP oil absorption. According to the internet website of Lion Corporation, "Introduction of carbon black KETJEN BLACK", searched on Sep. 21, 2002, on Internet <URL:http://www./lion.co.jp/chem/jn/sectop/carbon/k intro.htm>, KETJEN BLACK EC300J has a DBP oil absorption of as high as 360 ml/100 g; and KETJEN BLACK EC600JD, 495 ml/100 g. However, the carbon black having a high DBP oil absorption like KETJEN BLACK can not easily uniformly be dispersed in the resin coat layer. Hence, the effect of keeping the toner from charging up is not sufficiently brought out to tend to make the toner charged non-uniformly, and also tend to cause a leak of development bias, starting from the agglomeration of KETJEN BLACK. The carbon black like KETJEN BLACK may also insufficiently provide the resin coat layer with lubricity to tend to make the toner melt-adhere to the resin coat layer surface during long-term service. In this aspect as well, the toner tends to come charged insufficiently. Further, KETJEN BLACK tends to vary in resistivity depending on humidity, and hence may come to have a low charge-providing performance to toner especially in a high-temperature and high-humidity environment.

Meanwhile, the acetylene black is carbon black obtained by partial combustion of acetylene, and is usually produced by thermal decomposition or by a combustion process. As described in "Properties and Optimum Formulation of Carbon Black and Its Application Techniques", page 284, published by K.K. Gijutu Joho Kyokai on May 26, 1997, this acetylene black as well has a DBP oil absorption as high as 250 ml/100 g, and also its structures stand developed. Such structures come into contact with one another to form conducting paths to thereby manifest the electrical conductivity. However, because of the one having a high DBP oil absorption, like the above KETJEN BLACK, it can not easily be dispersed in the resin coat layer to tend to make it insufficient to keep the phenomenon of charge-up of toner from occurring, and tend to make the toner charged non-uniformly. In addition, the resin coat layer is insufficiently provided with the lubricity, and hence the toner tends to melt-adhere to the resin coat layer surface during long-term service, also tending to make the toner charged non-uniformly.

Japanese Patent Application Laid-open No. H07-013415 discloses a developing roller comprising a substrate and provided thereon a resin coat layer in which an ionic conductor has been dispersed in addition to a conductive fine powder such as carbon black and crystalline graphite particles. In this method, the addition of the ionic conductor is seen to be effective in keeping the phenomenon of charge-up of toner from occurring. However, the ionic conductor has a high humidity dependence. Hence, it follows that the resin coat layer varies greatly in its resistivity to cause a decrease in charge quantity of toner especially in a high-temperature and high-humidity environment. Thus, this method is still insufficient in regard to image density stability and fog during long-term service.

SUMMARY OF THE INVENTION

Accordingly, an object of the present invention is to provide a developer carrying member and a developing assembly which, even in continuous copying over a long term, do not cause any charge-up of toner, and prevent the toner from melt-adherent to the developer carrying member surface and developer layer thickness control member surface to maintain the state of uniform coating of a developer having a toner and to make the toner uniformly and quickly triboelectrically charged, so as to obtain high-grade images free of any image density decrease, image density non-uniformity, sleeve ghosts, fog and vertical streaks under service conditions in which running performance is required.

Another object of the present invention is to provide a developer carrying member and a developing assembly which are able to stably obtain high-grade images having a high image density, without causing the problems such as image density decrease, image density non-uniformity, vertical streaks and fog even in high-temperature and high-humidity and low-temperature and low-humidity environments.

Still another object of the present invention is to provide a developer carrying member and a developing assembly which prevent the phenomenon of charge-up of toner that tends to occur when images are formed using a toner having small particle diameter or a toner made spherical to a high degree, to make the toner less melt-adhere to the developer carrying member surface and developer layer thickness control member surface to maintain the state of uniform coating of a developer having a toner and to make the toner uniformly and quickly triboelectrically charged, so as to obtain high-grade images free of any image density decrease, image density non-uniformity, sleeve ghosts, fog and vertical streaks.

The above objects of the present invention are achieved by the following means.

A developer carrying member which holds thereon a developer having a toner for developing an electrostatic latent image held on an electrostatic latent image bearing member, wherein the developer carrying member has at least a substrate and a resin coat layer on the surface of the substrate, and the resin coat layer contains at least a binder resin and a carbon black, where the graphite (002) plane measured by X-ray diffraction of the carbon black has a lattice spacing of from 0.3370 nm or more to 0.3450 nm or less.

According to the present invention, the resin coat layer of the developer carrying member has superior lubricity and wear resistance, and this enables a developer carrying member and a developing assembly to be provided which, even in continuous copying for a long time, do not cause any charge-up of toner, and prevent the toner from melt-adhering to the developer carrying member surface and developer layer thickness control member surface to maintain the state of uniform coating of a developer having a toner and to make the toner uniformly and quickly triboelectrically charged, to thereby obtain high-grade images free of any image density decrease, image density non-uniformity, sleeve ghosts, fog and vertical streaks under conditions in which running performance is required.

Further features of the present invention will become apparent from the following description of exemplary embodiments with reference to the attached drawings.

DESCRIPTION OF THE EMBODIMENTS

Figure 1:
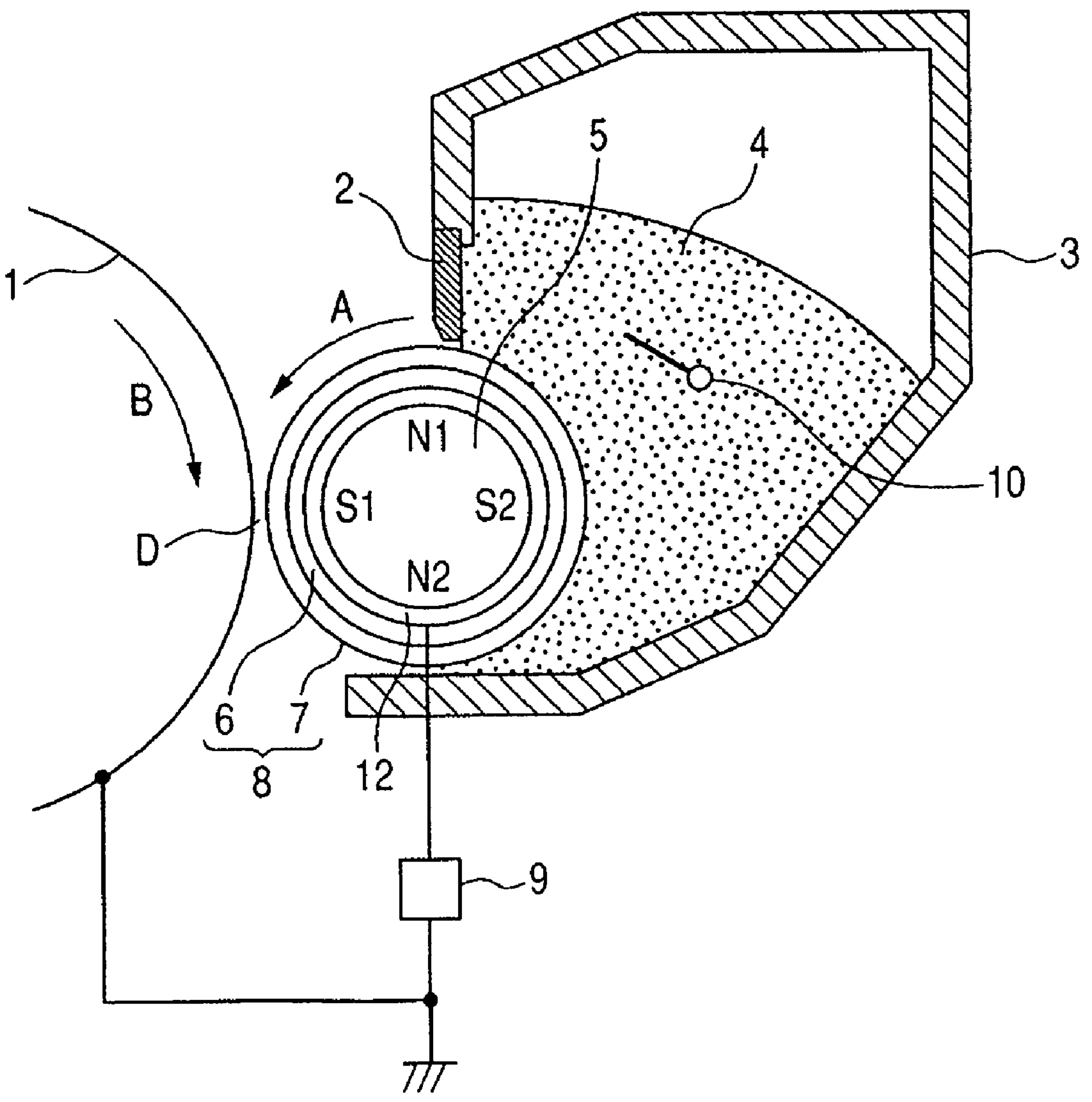
FIG. 1 is a diagrammatic view showing an embodiment of a developing assembly having the developer carrying member of the present invention, in a case in which a magnetic one-component developer having a magnetic toner is used.

The present invention is described below in detail by giving preferred embodiments.

The developer carrying member of the present invention is described first.

The developer carrying member of the present invention is a developer carrying member which holds thereon a developer having a toner for developing an electrostatic latent image held on an electrostatic latent image bearing member. It is essential that the developer carrying member has at least a substrate and a resin coat layer on the surface of the substrate, and the resin coat layer contains at least a binder resin and a carbon black, where the graphite (002) plane measured by X-ray diffraction of the carbon black has a lattice spacing [d(002)] of from 0.3370 nm or more to 0.3450 nm or less.

Inasmuch as the graphite (002) plane measured by X-ray diffraction of the carbon black has a lattice spacing (hereinafter also "d(002)") of from 0.3370 nm or more to 0.3450 nm or less, the resin coat layer surface can readily be formed in uniform lubricity and electrical conductivity, and further the resin coat layer surface can not easily change during its running. Hence, the developer carrying member brings out the effect of keeping the toner from charging up, over a long period of time, so that the toner can not easily come to melt-adhere to the developer carrying member surface and also the developer is stably uniformly be charged. The X-ray diffraction pattern 2θ measured by this X-ray diffraction of the carbon black has a main peak at from 25.84° or more to 26.46° or less.

It is difficult to produce carbon black having d(002) of less than 0.3370 nm, because it is difficult to effect crystallization. If on the other hand carbon black having d(002) of more than 0.3450 nm is used, the resin coat layer may have insufficient lubricity and electrical conductivity to damage the effect of keeping the toner from charging up and the effect of making the toner less melt-adhere to the developer carrying member surface.

In order to control the d(002)" of the carbon black so as to be from 0.3370 nm or more to 0.3450 nm or less, it is preferable to graphitize the carbon black.

Conventionally, the resistivity of the resin coat layer has been regulated by the type and amount of a substance having electrical conductivity which is to be incorporated in the resin coat layer. In particular, the carbon black has been in wide use because it can achieve certain arbitrary electrical conductivity only by controlling the amount for its addition. Where, however, the carbon black is used, it has often come about that the toner is inhibited from being charged because, if the carbon black is added in a small quantity, it is difficult to make the resin coat layer have resistivity at a desired low level, or because the toner comes to melt-adhere to the resin coat layer of the developer carrying member surface. If on the other hand the carbon black is added in a large quantity, it has come about that the carbon black present at the surface of the resin coat layer is in so high a proportion that the resin coat layer, although it can have a sufficient electrical conductivity, may conversely has a low film strength. Hence, it has been unable to maintain wear resistance in long-term service. Further, if the carbon black is added to a coating material in a large quantity when the resin coat layer is formed, a coating material fluid has a high viscosity when the carbon black is dispersed in a coating material resin fluid, to make it difficult to uniformly disperse the carbon black and other components in the coating material. As the result, the carbon black comes distributed non-uniformly in the resin coat layer formed, to cause problems on leak resistance and uniform charge-providing performance to toner.

On the other hand, the carbon black having the d(002) of from 0.3370 nm or more to 0.3450 nm or less is one in which the crystallinity of conventional carbon black has been made close to that of graphite. Accordingly, where this carbon black is incorporated in the resin coat layer, a resin coat layer having more uniform charge characteristics can be materialized. In particular, the higher crystallinity the carbon black has, the higher the above characteristics can be made.

The carbon black having been graphitized (hereinafter also "graphitized carbon black") as used in the present invention is obtained by graphitizing conventional carbon black by its heat treatment. The graphitized carbon black thus obtained has no functional groups present on particle surfaces and has a good electrical conductivity. It also contains impurities (e.g., sulfur and chlorine) only in a very small level, and has a small water adsorptivity. Hence, it has a characteristic feature that its conducting properties may less change depending on environment. In addition thereto, the graphitized carbon black has particle surfaces which have been changed over to a graphite crystal structure having good lubricating properties, and hence the surface of the developer carrying member having the resin coat layer containing this can no longer easily come contaminated by the toner. Thus, the incorporation of such graphitized carbon black in the resin coat layer at the developer carrying member surface enables the developer to be prevented from charging up, by its addition in a small quantity and also brings an improvement in film strength of the resin coat layer, making it possible for the developer to be stably and uniformly charged.

The carbon black serving as a raw material of the graphitized carbon black used in the present invention may include carbon black, lamp black, thermal black and channel black produced by a conventionally known furnace process, channel process or thermal process, and various by-product carbon blacks, any of which may be used. In the present invention, for the reasons as stated previously, carbon black is used which has been made to have the d(002) of from 0.3370 nm or more to 0.3450 nm or less by, e.g., graphitizing any of these carbon blacks. The use of the one obtained by graphitizing carbon black of various types is desirable for stabilizing the resin coat layer.

The carbon black may be graphitized by putting carbon black kept filled in a graphite crucible, into a usual Acheson furnace or high-frequency furnace, and heating the same in a non-oxidizing atmosphere. Temperature in graphitizing it may preferably be set within the range of from 1,700° C. to 3,200° C. If the temperature falls below this range, the graphitization does not proceed sufficiently, and any heating at a temperature beyond this range is unnecessary.

The crystallinity of such graphitized carbon black may be regulated by changing the temperature at the time of graphitization within the range of from 1,700° C. to 3,200° C.

The carbon black used in the present invention may preferably have an average primary particle diameter of from 10 nm or more to 100 nm or less, and more preferably from 12 nm or more to 80 nm or less. If it has an average primary particle diameter of less than 10 nm, the crystallization may proceed with difficulty when the carbon black is graphitized. Also, particles may mutually be highly agglomerative when the carbon black is dispersed, so that the coating material fluid obtained by dispersing the carbon black together with a coating material resin may have so high viscosity as to make the carbon black dispersed non-uniformly in the coating material fluid. If on the other hand the carbon black has an average primary particle diameter of more than 100 nm, it is difficult for the carbon black to be uniformly dispersed in the coating material fluid. As the result, the carbon black may come distributed unevenly at the resin coat layer surface to make electrical conductivity and lubricity poor at the resin coat layer surface at its part where the carbon black is present in a small quantity, to make uneven the developing performance of the developer carrying member. Also, the resin coat layer may wear or the development bias may come to leak, starting from large particles of carbon black as nuclei.

The carbon black used in the present invention may preferably have a DBP oil absorption of from 50 ml/100 g or more to 200 ml/100 g or less, and more preferably from 50 ml/100 g or more to 150 ml/100 g or less. The DBP oil absorption is indicated as a parameter of structures that is a standard of how the carbon black stand agglomerated. As long as it is within the above range, the carbon black has good electrical conductivity and dispersibility. This makes the carbon black less uneven or agglomerated in the resin coat layer formed at the developer carrying member surface, makes the resin coat layer provided with uniform electrical conductivity, makes the toner well chargeable, and enables improvement in leak resistance and wear resistance. In the present invention, the DBP oil absorption of the carbon black is measured according to JIS K 6217-1997.

If carbon black is used in which its structures stand so developed as to have a DBP oil absorption of more than 200 ml/100 g, the coating material may have so large viscosity as not to make dispersion uniform in the step of dispersing the coating material when the resin coat layer is formed, so that the carbon black may agglomerate in the resin coat layer to tend to cause a leak of development bias and make the resin coat layer have a low film strength, making it difficult to achieve good developing performance.

If on the other hand the carbon black has a DBP oil absorption of less than 50 ml/100 g, the carbon black may have a poor dispersion stability in the coating material when the resin coat layer is formed, so that the resin coat layer surface may have a low uniformity in electrical conductivity and a low lubricity to tend to cause the charge-up of the developer and also tend to cause a decrease in image density which is due to non-uniformity charging of the developer and make fog, density non-uniformity and so forth occur greatly.

The carbon black used in the present invention may further preferably have a BET specific surface area of 500 $m^2/g$ or less, and more preferably 300 $m^2/g$ or less. If it has a BET specific surface area of more than 500 $m^2/g$, the coating material may have so large viscosity as not to make dispersion uniform when the resin coat layer is formed, so that the carbon black may agglomerate in the resin coat layer to tend to cause a leak of development bias and make the resin coat layer have a low film strength, resulting in poor developing performance.

Further, in the present invention, graphitized carbon black may be used to the particle surfaces of which organic groups have been covalent-bonded to effect modification treatment of its particle surfaces. Such treatment effected brings an improvement in affinity for the coat resin of the carbon black because the organic groups are present at the particle surfaces of the graphitized carbon black in the state of being covalent-bonded, and enables the graphitized carbon black to be well dispersible. As the result, the resin coat layer to be obtained can be much improved in charge-providing performance and wear resistance to enable remarkable improvement in image quality of electrophotographs.

As a method for the modification treatment of the particle surfaces of the graphitized carbon black, available are, e.g., a method in which the particle surfaces are treated with an organometallic compound having an element such as titanium, aluminum, zirconium or silicon, and a method in which the particles are heated in the presence of a radical polymerization initiator. The organometallic compound used here may specifically include the following: Titanium chelate compounds, titanium coupling agents, aluminum chelate compounds, aluminum coupling agents, zirconium coupling agents and silane coupling agents. The radical polymerization initiator may include, e.g., organic peroxides, azo compounds and persulfate compounds. Any of these compounds may be used alone, or may be used in combination. Stated specifically, a method is available in which the graphitized carbon black is put into a mixed solvent of water and an organic solvent such as alcohol and is dispersed therein, and then the above compound for surface treatment is added to the resultant dispersion in an appropriate quantity, followed by heating.

In the present invention, it is desirable that the resin coat layer formed at the surface of the developer carrying member is electrically conductive in order to prevent the developer from sticking to the developer carrying member surface because of the charge-up, and the developer from being defectively charged.

The resin coat layer may preferably have a volume resistivity of $10^4$ Ωcm or less, and more preferably $10^3$ Ωcm or less. If the resin coat layer has a volume resistivity of more than $10^4$ Ωcm, the toner may stick to the developer carrying member surface because of the charge-up and the toner may tend to come charged defectively.

In order to attain the above volume resistivity as the resin coat layer, the carbon black used in the present invention may preferably be added in an amount of from 8 parts by mass to 100 parts by mass based on 100 parts by mass of the binder resin to be contained in the resin coat layer. If it is added in an amount of less than 8 parts by mass, the resin coat layer may have a high volume resistivity and also a poor lubricity to tend to cause deterioration of developing performance because of the charge-up of toner and also cause sticking or melt adhesion of toner to the developer carrying member surface. If on the other hand it is added in an amount of more than 100 parts by mass, the resin coat layer may have a low charge-providing performance to toner and a low film strength to make the toner come charged non-uniformly, resulting in a poor developing performance.

In the developer carrying member of the present invention, having the substrate and the resin coat layer on the substrate surface, other conductive fine particles may further be used in combination together with the carbon black, as long as they do not damage the properties of the carbon black. Such conductive fine particles may include, e.g., fine powders of metals such as aluminum, copper, nickel and silver; and metal oxides such as antimony oxide, indium oxide, tin oxide, titanium oxide, zinc oxide, molybdenum oxide and potassium titanate.

As the binder resin used in the resin coat layer constituting the developer carrying member of the present invention, any known resins conventionally commonly used in resin coat layers of developer carrying members may be used. It may include, e.g., the following: Thermoplastic resins such as styrene resins, vinyl resins, polyether sulfone resins, polycarbonate resins, polyphenylene oxide resins, polyamide resins, fluorine resins and acrylic resins; and thermo- or photosetting resins such as epoxy resins, polyester resins, alkyd resins, phenolic resins, melamine resins, polyurethane resins, urea resins, silicone resins and polyimide resins. In particular, preferred are resins having releasability, such as silicone resins and fluorine resins; or resins having good mechanical properties, such as polyether sulfone resins, polycarbonate resins, polyphenylene oxide resins, polyamide resins, phenolic resins, polyester resins, polyurethane resins, styrene resins and acrylic resins.

In the present invention, in order to regulate the charge-providing performance of the developer carrying member, a charge control agent may further be incorporated in the resin coat layer. In such a case, the charge control agent may be in a content of from 1 part by mass to 100 parts by mass based on 100 parts by mass of the binder resin to be contained in the resin coat layer. If it is in a content of less than 1 part by mass, the effect to be brought by the addition of the charge control agent is not seen. If it is in a content of more than 100 part by mass, it may poorly dispersed in the resin coat layer to tend to cause a lowering of film strength.

The charge control agent may include, e.g., the following: Nigrosine and modified products thereof, modified with a fatty acid metal salt; quaternary ammonium salts such as tributylbenzylammonium 1-hydroxy-4-naphthosulfonate and tetrabutylammonium teterafluoroborate, and analogues of these, including onium salts such as phosphonium salts, and lake pigments of these (lake-forming agents may include tungstophosphoric acid, molybdophosphoric acid, tungstomolybdophosphoric acid, tannic acid, lauric acid, gallic acid, ferricyanides and ferrocyanides); metal salts of higher fatty acids; diorganotin oxides such as dibutyltin oxide, dioctyltin oxide and dicyclohexyltin oxide; diorganotin borates such as dibutyltin borate, dioctyltin borate and dicyclohexyltin borate; guanidine compounds, and imidazole compounds.

The resin coat layer constituting the developer carrying member of the present invention may further be incorporated with graphitized particles. In the present invention, the graphitized particles may preferably have, in their X-ray diffraction chart obtained by measurement by X-ray diffraction, a main peak at from 25.46° or more to 26.67°or less, and more preferably at from 25.46° or more to 25.84° or less, in the X-ray diffraction pattern 2θ. If the position of the main peak in 2θ exceeds 26.67°, the use of the graphitized particles is effective for the initial-stage developing performance and in making melt adhesion less occur, but the graphitization has proceeded in excess to make the resin coat layer have a low hardness, so that the developer carrying member may not sufficiently be provided with durability. In graphitized particles the position of the main peak in 2θ of which is less than 25.46°, the graphitization has not sufficiently proceeded, and hence image improvements such as improvement in developing performance and improvement in resistance to melt adhesion are less effective to bring about a poor image stability. In the present invention, the graphitized particles may also preferably be particles having a number average particle diameter of from 0.5 μm or more to 25.0 μm or less.

The graphitized particles in the present invention may be obtained by the methods shown below, which, however, are not necessarily limited to these methods.

As a method for obtaining especially preferable graphitized particles used in the present invention, graphitization is effected using, as a raw material, particles which are optically anisotropic and formed of a single phase, such as mesocarbon microbeads or bulk mesophase pitch particles. This is preferable in order to make the graphitized particles have a high degree of graphitization and also retain their spherical shape. Optical anisotropy of the above raw material comes from stacks of aromatic molecules, and its orderliness develops further by graphitization treatment, so that the graphitized particles having been graphitized to a high degree can be obtained.

In the case when the bulk mesophase pitch is used as the raw material from which the graphitized particles are to be obtained, a bulk mesophase pitch capable of softening and melting with heating may preferably be used in order to obtain graphitized particles which are spherical and have a high degree of graphitization. What is typical as a method for obtaining the bulk mesophase pitch, it is, e,g, a method in which β-resin is extracted from coal-tar pitch or the like by solvent fractionation, and this is hydrogenated to carry out heavy-duty treatment to obtain the mesophase pitch. The mesophase pitch may further be finely pulverized after the heavy-duty treatment and then treated with benzene or toluene to remove the solvent-soluble matter. This bulk mesophase pitch may preferably have 95% by mass or more of quinoline-soluble matter. If one having less than 95% by mass of the same is used, the interiors of particles can not easily be liquid-phase carbonized and may come solid-phase carbonized, and hence the particles formed may be kept in a crushed state not to obtain any spherical particles.

As a method for obtaining the graphitized particles by using mesophase pitch, first, the above bulk mesophase pitch is finely pulverized into a size of from 2 μm to 25 μm, and the particles obtained are subjected to heat treatment in air at about 200° C. to 350° C. to carry out oxidation treatment lightly. This oxidation treatment makes the bulk mesophase pitch particles infusible only at their surfaces, and the particles are prevented from melting or fusing at the time of heat treatment for graphitization in the next step. The bulk mesophase pitch particles having been subjected to oxidation treatment may preferably have an oxygen content of from 5% by mass to 15% by mass. If they have an oxygen content of less than 5% by mass, particles tend to greatly fuse one another at the time of heat treatment. If they have an oxygen content of more than 15% by mass, particles may be oxidized up to their interiors, and may be graphitized as their shape is in a crushed state to make it difficult to obtain spherical particles. Such difficulties may come. Next, the bulk mesophase pitch particles having thus been subjected to oxidation treatment are subjected to primary firing at about 800° C. to 1,200° C. to make them carbonized and subsequently to secondary firing at about 2,000° C. to 3,500° C. both in an inert atmosphere of nitrogen, argon or the like to obtain the desired graphitized particles.

As a method for obtaining the mesocarbon microbeads, another preferable raw material for obtaining the graphitized particles used in the present invention, a typical method is as follows: Coal type heavy oil or petroleum type heavy oil is subjected to heat treatment at a temperature of from 300° C. to 500° C. to effect polycondensation to form crude mesocarbon microbeads. Then the reaction product obtained is subjected to treatment such as filtration, sedimentation by leaving at rest, or centrifugation, to separate mesocarbon microbeads, followed by washing with a solvent such as benzene, toluene or xylene, and further followed by drying to obtain the mesocarbon microbeads.

As a method for graphitization using the mesocarbon microbeads thus obtained, the mesocarbon microbeads having been dried are first kept mechanically primarily dispersed by a force mild enough not to break them. This is preferable in order to prevent particles from coalescing after graphitization and attain uniform particle size. The mesocarbon microbeads having been thus kept primarily dispersed are subjected to primary heat treatment at a temperature of from 200° C. to 1,500° C. in an inert atmosphere to undergo carbonization. The carbonized product having been subjected to the primary heat treatment is also mechanically dispersed by a force mild enough not to break the carbonized product. This is preferable in order to prevent particles from coalescing after graphitization or attain uniform particle size. The carbonized product having been subjected to such secondary dispersion treatment are subjected to secondary heat treatment at a temperature of from about 2,000° C. to 3,500° C. in an inert atmosphere to obtain the desired graphitized particles.

In producing the graphitized particles by using any raw materials, the particles may preferably be fired at the temperature of from 2,000° C. to 3,500° C. If the particles are fired at a temperature of less than 2,000° C., the graphitized particles have a high hardness and hence show a tendency of being improved in durability, but the graphitized particles may stand graphitized insufficiently and may have low electrical conductivity and lubricity to cause the charge-up of toner, tending to make image quality poor because of image density decrease, fog, spots around letters, and so forth. Such particles may further cause rub scratches on the developer layer thickness control member when an elastic member is used in the control member, tending to cause lines and non-uniformity in solid images. If the particles are fired at a temperature of more than 3,500° C., the graphitized particles may stand graphitized in excess, and hence the graphitized particles may have a low hardness to tend to make the resin coat layer have a low wear resistance, a low mechanical strength and a low charge-providing performance to toner because of a poor wear resistance of the graphitized particles.

The graphitized particles in the resin coat layer may preferably be in a content of from 2 parts by mass to 150 parts by mass, and more preferably from 4 parts by mass to 100 parts by mass, based on 100 parts by mass of the binder resin in the resin coat layer. If the graphitized particles are in a content of less than 2 parts by mass, the addition of the graphitized particles may be less effective. If they are in a content of more than 150 parts by mass, the resin coat layer may have too low adherence, resulting in a poor wear resistance.

In the present invention, the carbon black having the d(002) of from 0.3370 nm or more to 0.3450 nm or less and the graphitized particles may preferably be in a mixing proportion [(mass of carbon black)/(mass of graphitized particles)] of from 0.01 to 20.00, more preferably from 0.04 to 5.00, and still more preferably from 0.04 to 2.00, in the interior of the resin coat layer.

Unevenness-providing particles may further be incorporated in the resin coat layer constituting the developer carrying member of the present invention. The unevenness-providing particles has the effects of making the resin coat layer surface of the developer carrying member retain an appropriate surface roughness to improve the transport performance of the developer having a toner, providing more opportunities of contact between the developer and the resin coat layer and also improving the wear resistance of the resin coat layer, and further moderating the pressure applied from an elastic blade to developer particles when an elastic blade is used as the developer layer thickness control member, to make the toner not easily melt-adhere to the developer carrying member.

The unevenness-providing particles may preferably have a volume average particle diameter of from 1 μm to 20 μm, and more preferably from 2 to 15 μm. If the unevenness-providing particles have a volume average particle diameter of less than 1 μm, the effects to be brought by their addition may be obtained with difficulty. If on the other hand the unevenness-providing particles have a volume average particle diameter of more than 20 μm, the resin coat layer surface may have so non-uniform surface roughness and also may have so large surface roughness as to make the toner insufficiently chargeable and further tend to make the toner melt-adhere in the vicinity of such unevenness-providing particles to cause poor image quality such as fog and image density decrease. In addition, when the elastic blade is used, the blade tends to cause scratches because of hill-shaped portions of unevenness which stand protruded to the resin coat layer surface, and the development bias may tend to come to leak starting from such hill-shaped portions of unevenness which stand protruded.

The unevenness-providing particles may preferably have a true density of 3 g/cm$^3$ or less, more preferably 2.7 g/cm$^3$ or less, and still more preferably from 0.9 to 2.3 g/cm$^3$. If the unevenness-providing particles have a true density of more than 3 g/cm$^3$, the unevenness-providing particles may insufficiently be dispersible in the resin coat layer, and hence the resin coat layer surface may not easily be provided with uniform roughness to tend to make the toner charged non-uniformly and make the resin coat layer have an insufficient film strength. If on the other hand the unevenness-providing particles have a true density of less than 0.9 g/cm$^3$, too, it may come about that the unevenness-providing particles are insufficiently dispersed in the resin coat layer.

The shape of the unevenness-providing particles may preferably be spherical.

The "spherical" in such spherical particles as termed in the present invention means that the unevenness-providing particles have a length/breadth ratio of from 1.0 to 1.5 in their particle projected images. In the present invention, it is preferable to use particles having a length/breadth ratio of from 1.0 to 1.2, and is particularly preferable to use truly spherical particles.

If the unevenness-providing particles have a length/breadth ratio of more than 1.5, the unevenness-providing particles may insufficiently be dispersed in the resin coat layer to make the resin coat layer have a non-uniform surface roughness.

Any known particles may be used as such unevenness-providing particles, which may include, e.g., spherical resin particles and spherical metal oxide particles.

The resin coat layer may be formed by coating on a substrate a coating material prepared by dispersing and mixing the respective components for the resin coat layer in a solvent, followed by drying to harden or by curing. To disperse and mix the respective components in the solvent, a known dispersion machine that utilizes beads may preferably be used, as exemplified by a sand mill, a paint shaker, Daino mill or Pearl mill. As coating methods, known coating methods may be used, such as dipping, spraying and roll coating.

In the present invention, the resin coat layer may preferably have, as its surface roughness, an arithmetic-mean roughness Ra (JIS B 0601-2001) of from 0.2 μm to 2.5 μm, and more preferably from 0.2 μm to 1.5 pm. If the resin coat layer surface has an Ra of less than 0.2 μm, the resin coat layer surface has almost no unevenness, and hence the level of the developer having a toner may become unstable on the developer carrying member and also the resin coat layer may have insufficient wear resistance and resistance to contamination by developer. If on the other hand it has an Ra of more than 2.5 μm, the developer on the developer carrying member may be in so large a transport level as to make the toner not easily uniformly charged and also make the resin coat layer have a low mechanical strength.

The resin coat layer constituted as described above may preferably have a thickness of 25 μm or less, more preferably 20 μm or less, and still more preferably from 4 μm to 20 μm. This is preferable in order to achieve a uniform layer thickness. The thickness is not particularly limited to this thickness. This thickness is achievable as long as the resin coat layer is 4,000 mg/$m^2$ to 20,000 mg/$m^2$ in coverage mass, which depends on materials used in the resin coat layer.

In the present invention, the resin coat layer may preferably have, in its X-ray diffraction chart obtained by measurement by X-ray diffraction, a main peak in the range of from 25.46° or more to 26.67° or less in the X-ray diffraction pattern 2θ.

It is also preferable that the whole region of a half width of the main peak is in the range of from 25.09° or more to 27.04° or less. Where peaks are separable as in FIG. 6, the half width is measured in the state of peak separation. Where some peaks overlap but the peaks are unseparable, the half width is determined as the peaks are kept to overlap and base lines stand corrected. For simplification, as long as a half width determined only by base-line correction falls within the above range, it is unnecessary to determine the half width by peak separation made afresh.

More specifically, in the case when the main peak is in the range of from 25.46° or more to 26.67° or less and further the half width of the main peak is in the range of from 25.09° or more to 27.04° or less, the graphitized particles and carbon black incorporated in the resin coat layer stand graphitized to a degree with less scattering, and hence the properties of these graphitized particles and carbon black are brought out. For example, the resin coat layer can have an enhanced durability and printed images can have an improved image quality.

Figure 6:
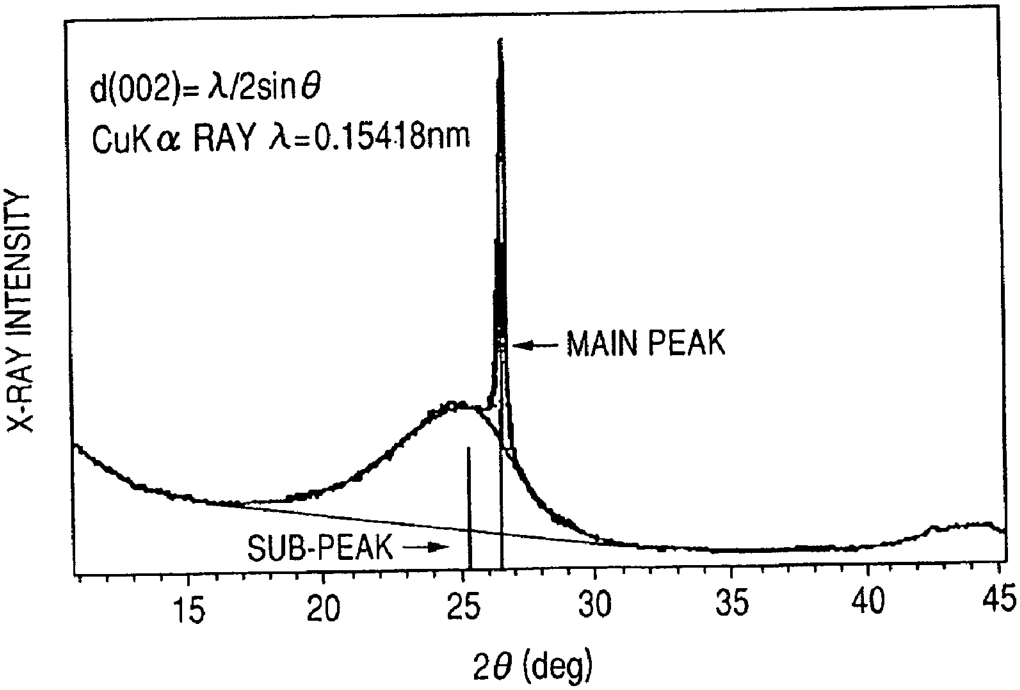
FIG. 6 shows an example of an X-ray diffraction chart obtained by measurement by X-ray diffraction of the resin coat layer of the developer carrying member.

In the present invention, it is preferable to incorporate the resin coat layer with i) the graphitized particles having a main peak in the range of from 25.46° or more to 25.84° or less in the X-ray diffraction pattern 2θ and ii) the carbon black having a main peak in the range of from 25.84 or more to 26.46 or less in the X-ray diffraction pattern 20. In the case when the graphitized particles and carbon black which differ in main-peak position in 2θ in this way are used, in the X-ray diffraction chart obtained by measurement by X-ray diffraction of the resin coat layer, a sub-peak is sometime observed in addition to the main peak as is seen in FIG. 6, thus the peaks are separable. When the peak are separated in such an occasion where such an X-ray diffraction chart is obtained by measurement, it is preferable that the X-ray diffraction pattern 2θ has at least one peak in each of the range of from 25.46° or more to 25.84° or less and the range of from 25.84° or more to 26.46° or less. In FIG. 6, an example is shown in which the main peak is sharp in the state it overlaps with the sub-peak, but the peaks may come reverse depending on the mixing ratio of the graphitized particles to the carbon black.

As the substrate of the developer carrying member, used in the present invention, a cylindrical member, a columnar member and a beltlike member are available. In a developing method in which the developer carrying member is not in contact with the electrostatic latent image bearing member such as a photosensitive drum, a cylindrical tube or solid rod of a rigid material such as a metal may preferably be used. What may preferably be used as such a substrate is a non-magnetic metal or alloy such as aluminum, stainless steel or brass molded in a cylindrical shape or in a columnar shape and then subjected to abrasion, grinding or the like. Such a substrate is used after it has been shaped or worked in a high precision in order to improve the uniformity of images to be formed. For example, it may preferably be 30 μm or less, more preferably 20 μm or less, and still more preferably 10 μm or less, in straightness in its lengthwise direction. The substrate may also preferably be 30 μm or less, more preferably 20 μm or less, and still more preferably 10 μm or less, in variation width of the gap between the developer carrying member and the electrostatic latent image bearing member, e.g., in variation width of the gap formed between the developer carrying member and a vertical face when the developer carrying member is rotated in the state it is placed against the vertical face via a uniform spacer. Aluminum may preferably be used as the substrate in view of material cost and readiness to work.

As a substrate used when a developing method is used in which the developer carrying member is brought into direct contact with the electrostatic latent image bearing member such as a photosensitive drum, a cylindrical member may preferably be used which is constituted of a mandrel made of a metal and provided thereon a layer formed of a rubber or elastomer such as EPDM or silicone. In a developing method making use of a developer having a magnetic toner, the substrate may be of a cylindrical shape and a magnet roller may be disposed in the interior of the former in order to magnetically attract the magnetic toner to, and hold it on, the developer carrying member.

The developing assembly of the present invention, having the aforesaid developer carrying member of the present invention, is described next.

FIG. 1 is a diagrammatic view showing an embodiment of a developing assembly having the developer carrying member of the present invention, in a case in which a magnetic one-component developer having a magnetic toner is used.

As shown in FIG. 1, a photosensitive drum 1 as a latent image bearing member holding thereon an electrostatic latent image formed by a known process is rotated in the direction of an arrow B.

A developing sleeve 8 as the developer carrying member is so disposed as to face the photosensitive drum 1, leaving a stated gap between them, to form a developing zone D. This developing sleeve 8 carries a magnetic one-component developer 4 having a magnetic toner, fed from the interior of a hopper 3 serving as a developer container, and is rotated in the direction of an arrow A. Thus, the magnetic one-component developer 4 is transported to the developing zone D. Inside the developing sleeve 8, a magnet roller 5 internally provided with a magnet having magnetic poles of N-poles at the positions of N1 and N2 and S-poles at the positions of S1 and S2 is provided so that the magnetic one-component developer 4 is magnetically attracted to and held on the developing sleeve 8.

The developing sleeve 8 used in this developing assembly has a metal cylindrical tube 6 as the substrate and provided thereon a resin coat layer 7. Inside the hopper 3, an agitating blade 10 for agitating the magnetic one-component developer 4 is provided. The developing sleeve 8 and the magnet roller 5 stands non-contact, and have a gap 12.

The magnetic one-component developer 4 gains triboelectric charges that enables development of the electrostatic latent image on the photosensitive drum 1, as a result of the friction between the developer particles one another and between the developer and the resin coat layer 7 of the developing sleeve 8. In order to form a layer of the magnetic one-component developer 4 to be transported to the developing zone D, and control the thickness of this layer, a magnetic control blade 2 made of a ferromagnetic metal, serving as a developer layer thickness control member, vertically extends downwards from the hopper 3 in such a manner that it faces on the developing sleeve 8 in a gap width of about 50 μm to 500 μm from the surface of the developing sleeve 8. The magnetic line of force exerted from the magnetic pole N1 of the magnet roller 5 is converged to the magnetic control blade 2 to thereby form on the developing sleeve 8 a thin layer of the magnetic one-component developer 4. In this example, a non-magnetic blade may also be used in place of the magnetic control blade 2. The thickness of the thin layer of the magnetic one-component developer 4, thus formed on the developing sleeve 8, may preferably be much smaller than the minimum gap between the developing sleeve 8 and the photosensitive drum 1 in the developing zone D.

It is effective to set the developer carrying member in a developing assembly of the type the electrostatic latent image is developed through such a magnetic one-component developer thin layer, i.e., a non-contact type developing assembly. The developer carrying member of the present invention may also be used in a developing assembly of the type the thickness of the developer layer is larger than the minimum gap between the developing sleeve 8 and the photosensitive drum 1 in the developing zone D, i.e., a contact type developing assembly. In the following description, to avoid complicacy of description, the non-contact developing assembly as described above is taken as an example.

In order to cause to fly the magnetic one-component developer 4 having a magnetic toner, carried on the developing sleeve 8, a development bias voltage is applied to the developing sleeve 8 through a development bias power source 9 serving as a bias applying means. When a DC voltage is used as the development bias voltage, a voltage having a value intermediate between the potential at electrostatic latent image areas (the region rendered visible upon attraction of the magnetic one-component developer 4) and the potential at back ground areas may preferably be applied to the developing sleeve 8. In order to enhance the density of images to be formed by development or improve the gradation thereof, an alternating bias voltage may be applied to the developing sleeve 8 to form in the developing zone D a vibrating electric field whose direction alternately reverses. In such a case, an alternating bias voltage formed by superimposing the above DC voltage component having a value intermediate between the potential at image areas to be developed and the potential at back ground areas may preferably be applied to the developing sleeve 8.

In the case of regular development, where a developer is attracted to high-potential areas of an electrostatic latent image having high-potential areas and low-potential areas, a developer chargeable to a polarity reverse to the polarity of the electrostatic latent image is used. In the case of reverse development, where a developer is attracted to low-potential areas of an electrostatic latent image having high-potential areas and low-potential areas, a developer chargeable to the same polarity as the polarity of the electrostatic latent image is used. What is meant by the high-potential areas or the low-potential areas is expressed in terms of the absolute value. In either case, the magnetic one-component developer 4 is charged upon its friction with at least the developing sleeve 8.

Figure 2:
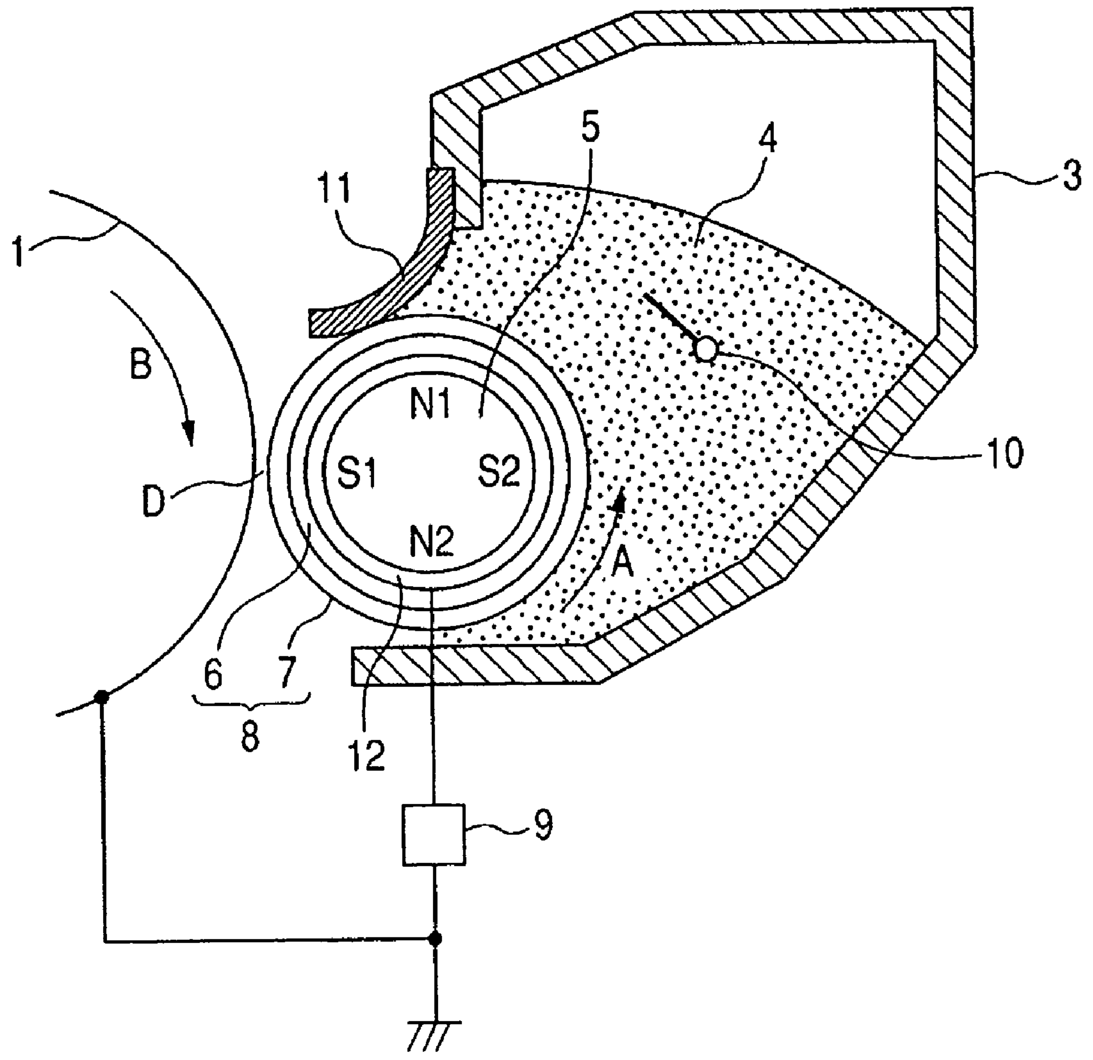
FIG. 2 is a diagrammatic view showing another embodiment of the developing assembly having the developer carrying member of the present invention, in a case in which a magnetic one-component developer having a magnetic toner is used.
Figure 3:
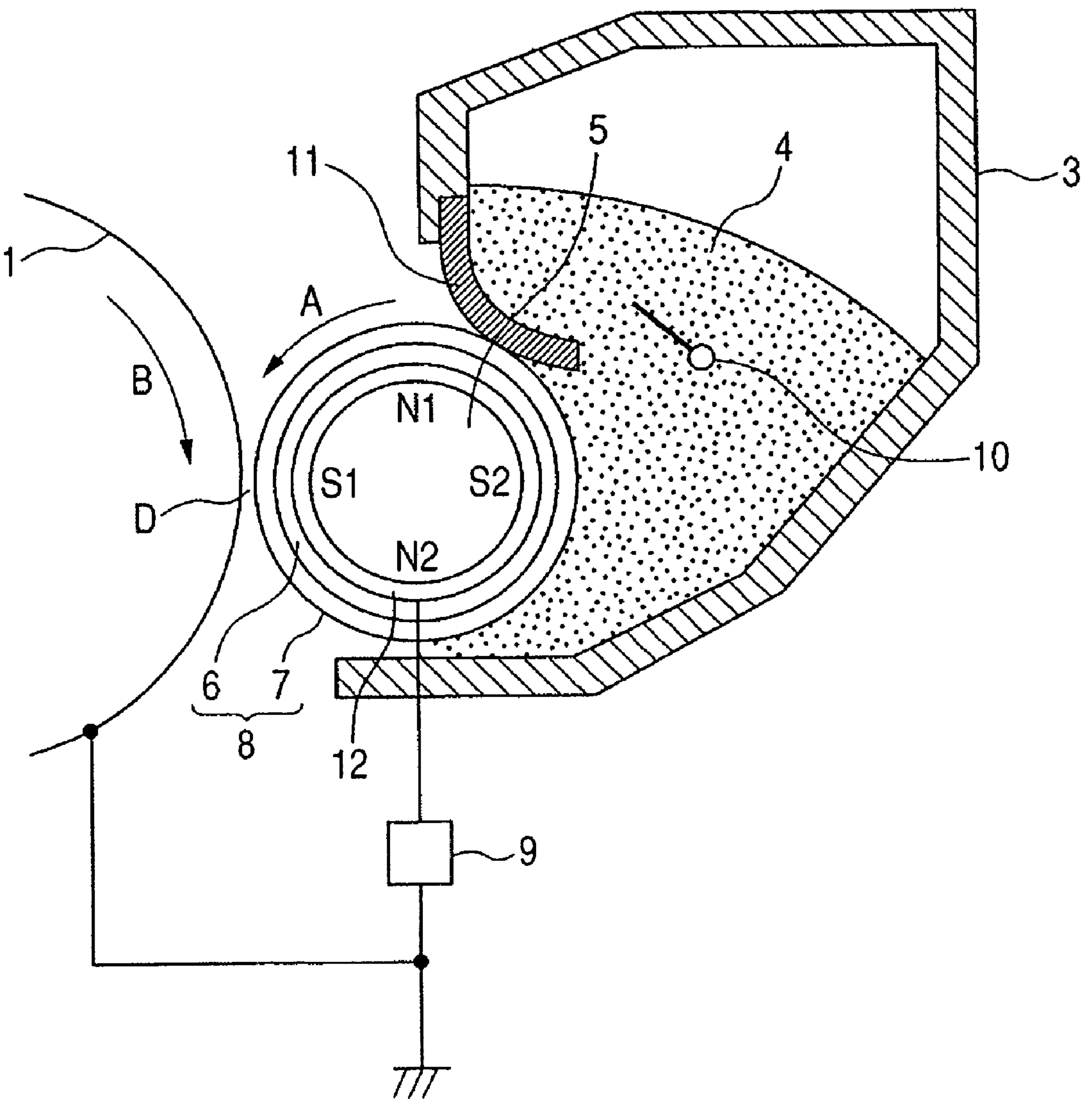
FIG. 3 is a diagrammatic view showing still another embodiment of the developing assembly having the developer carrying member of the present invention, in a case in which a magnetic one-component developer having a magnetic toner is used.

FIGS. 2 and 3 are each a diagrammatic view showing another embodiment of the developing assembly having the developer carrying member of the present invention.

In the developing assemblies shown in FIGS. 2 and 3, an elastic control blade 11 composed of an elastic sheet made of a material having a rubber elasticity, such as urethane rubber or silicone rubber, or a material having a metal elasticity, such as bronze or stainless steel, is used as the developer layer thickness control member which controls the layer thickness of the magnetic one-component developer 4 on the developing sleeve 8. In the developing assembly shown in FIG. 2, this elastic control blade 11 is brought into pressure touch with the developing sleeve 8 in the same direction as its rotational direction. In the developing assembly shown in FIG. 3, this elastic control blade 11 is brought into pressure touch with the developing sleeve 8 in the direction reverse to its rotational direction. In these developing assemblies, the developer layer thickness control member is elastically brought into pressure touch with the developing sleeve 8 through the developer layer to thereby form the thin layer of the magnetic one-component developer on the developing sleeve. Hence, a much thinner developer layer than the case in which the magnetic control blade is used as illustrated in FIG. 1 can be formed on the developing sleeve 8.

FIGS. 1 to 3 diagrammatically exemplify the developing apparatus of the present invention. Needless to say, there may be various modes of the shape of the developer container (the hopper 3), the presence or absence of the agitating blade 10 and the arrangement of magnetic poles. Of course, these assemblies may also be used in development making use of a two-component developer having a toner and a carrier.

Figure 4:
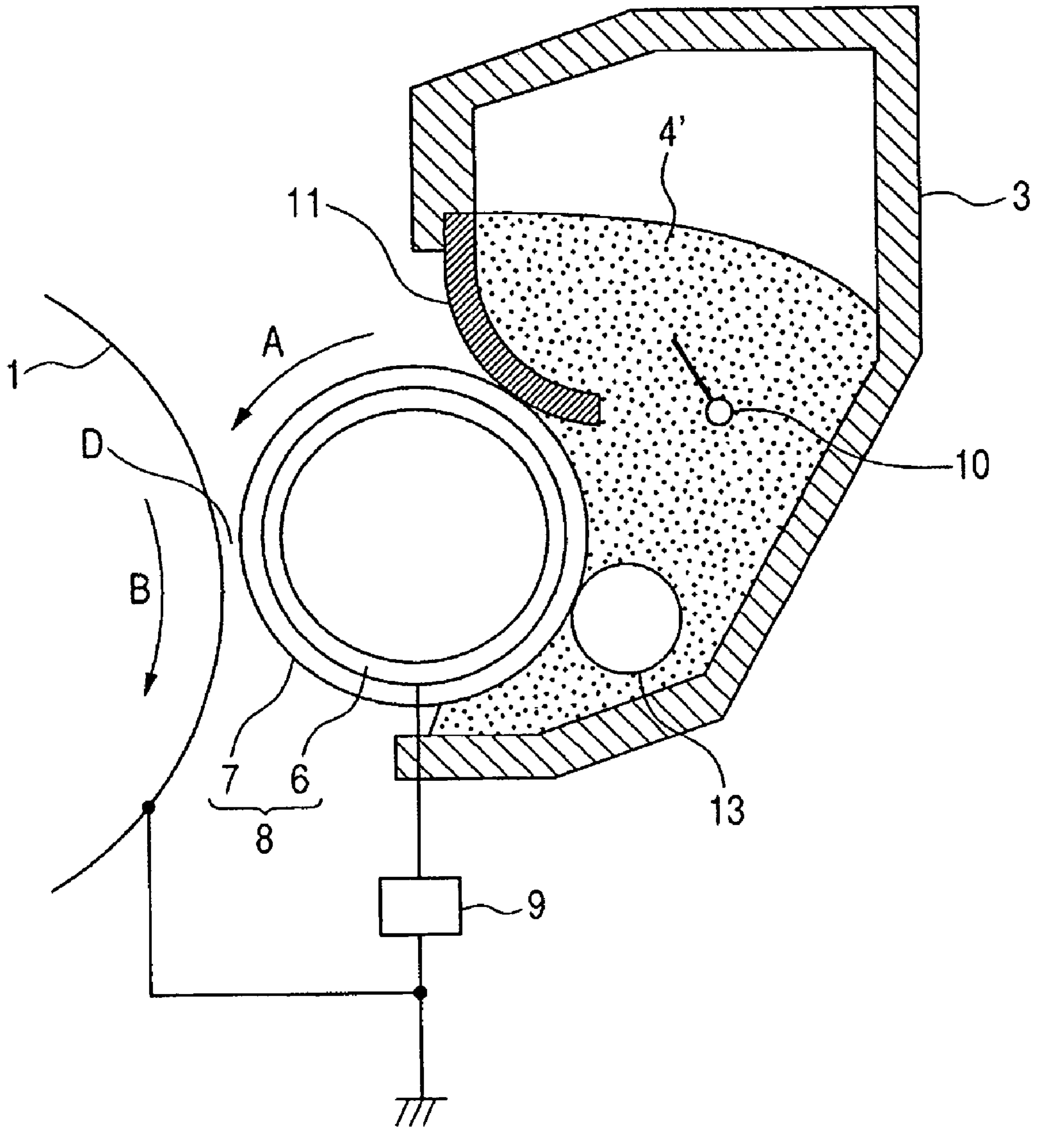
FIG. 4 is a diagrammatic view showing an embodiment of a developing assembly having the developer carrying member of the present invention, in a case in which a non-magnetic one-component developer having a non-magnetic toner is used.

FIG. 4 is a diagrammatic view showing the construction of a developing assembly in a case in which a non-magnetic one-component developer having a non-magnetic toner is used.

As shown in FIG. 4, a photosensitive drum 1 as a latent image bearing member holding thereon an electrostatic latent image formed by a known process is rotated in the direction of an arrow B. A developing sleeve 8 as the developer carrying member is constituted of a cylindrical tube (substrate) 6 made of a metal, and a resin coat layer 7 formed on the former's surface. Since the non-magnetic one-component developer is used, no magnet is provided inside the metal cylindrical tube 6. In place of the metal cylindrical tube, a columnar member may be used.

Inside a hopper 3 serving as a developer container, an agitating blade 10 for agitating a non-magnetic one-component developer 4' is provided.

A developer feed/stripping member 13 for feeding the non-magnetic one-component developer 4' to the developing sleeve 8 and also stripping off the non-magnetic one-component developer present on the surface of the developing sleeve 8 after development is provided in contact with the developing sleeve 8. As a feed/stripping roller 13 as the developer feed/stripping member is rotated in the same direction as the developing sleeve 8, the surface of the feed/stripping roller 13 moves in the direction counter to the surface movement of the developing sleeve 8. Thus, the non-magnetic one-component developer 4' fed from the hopper 3 is fed onto the developing sleeve 8. The developing sleeve 8 carries the non-magnetic one-component developer 4' and is rotated in the direction of an arrow A. Thus, the non-magnetic one-component developer 4' is transported to a developing zone D which is a zone where the developing sleeve 8 faces the photosensitive drum 1 surface. The developer layer thickness of the non-magnetic one-component developer carried on the developing sleeve 8 is controlled by a developer layer thickness control member 11 coming into pressure touch with the surface of the developing sleeve 8 through the developer layer. The non-magnetic one-component developer gains triboelectric charges that enable the development of the electrostatic latent image on the photosensitive drum 1, as a result of its friction with the developing sleeve 8.

The thickness of the thin layer of the non-magnetic one-component developer 4', thus formed on the developing sleeve 8, may preferably be much smaller than the minimum gap in the developing zone D between the developing sleeve 8 and the photosensitive drum 1. The present invention is especially effective when applied in such a non-contact type developing assembly that develops the electrostatic latent image through such a developer layer. The present invention, however, may also be applied in a contact type developing assembly in which the thickness of the developer layer is larger than the minimum gap between the developing sleeve 8 and the photosensitive drum 1 in the developing zone. In the following description, to avoid complicacy of description, the non-contact developing assembly is taken as an example.

In order to cause to fly the non-magnetic one-component developer 4' carried on the developing sleeve 8, a development bias voltage is applied to the developing sleeve 8 through a development bias power source 9. When a DC voltage is used as this development bias voltage, a voltage having a value intermediate between the potential at electrostatic latent image areas (the region rendered visible upon attraction of the non-magnetic one-component developer 4') and the potential at back ground areas may preferably be applied to the developing sleeve 8. In order to enhance the density of images to be formed by development or improve the gradation thereof, an alternating bias voltage may be applied to the developing sleeve 8 to form in the developing zone a vibrating electric field whose direction alternately reverses. In such a case, an alternating bias voltage formed by superimposing the above DC voltage component having a value intermediate between the potential at image areas and the potential at back ground areas may preferably be applied to the developing sleeve 8.

In the case of what is called regular development, where the developer is attracted to high-potential areas of an electrostatic latent image having high-potential areas and low-potential areas, a developer chargeable to a polarity reverse to the polarity of the electrostatic latent image is used. In the case of what is called reverse development, where the developer is attracted to low-potential areas of the electrostatic latent image, a developer chargeable to the same polarity as the polarity of the electrostatic latent image is used. What is meant by the high-potential areas or the low-potential areas is expressed by the absolute value. In either case, the non-magnetic one-component developer 4' is charged upon its friction with the developing sleeve 8 to have the polarity for developing the electrostatic latent image.

As the developer feed/stripping member 13, it may preferably be an elastic roller member made of a material such as resin, rubber or sponge. In place of such an elastic roller, a belt member or a brush member may also be used as the feed/stripping member. The non-magnetic one-component developer not moved onto the photosensitive drum 1 for development is first stripped off the surface of the developing sleeve by means of the developer feed/stripping member 13, to thereby prevent any immobile toner from coming about on the developing sleeve and make the charging of the non-magnetic one-component developer uniform.

Where a feed/stripping roller 13 formed of such an elastic roller is used as the developer feed/stripping member, the feed/stripping roller 13 may preferably be, when rotated in the counter direction to the developing sleeve 8, at a peripheral speed of from 20% to 120%, and more preferably from 30% to 100%, with respect to the peripheral speed of the developing sleeve 8.

If the feed/stripping roller 13 is rotated at a peripheral speed of less than 20%, the non-magnetic one-component developer may be fed in an insufficient quantity, so that follow-up performance for solid images may lower to cause ghost images. If it is rotated at a peripheral speed of more than 120%, the non-magnetic one-component developer may be fed in a large quantity, so that the developer layer thickness may poorly be controlled or the change quantity may be insufficient to cause fog. Moreover, the developer is easily damaged to tend to cause fog and non-magnetic one-component developer melt adhesion due to deterioration of the non-magnetic one-component developer.

The feed/stripping roller 13 may be rotated in the direction counter to the rotational direction at the surface of the developing sleeve. This is more preferable in view of stripping performance and feed performance.

The developer feed/stripping member 13 may have a penetration (deformation under pressure) to the developing sleeve 8, of from 0.5 mm to 2.5 mm. This is preferable in view of the feed performance and stripping performance of the developer.

If the developer feed/stripping member 13 has a penetration of less than 0.5 mm, ghosts tend to occur because of insufficient stripping. If it has a penetration of more than 2.5 mm, the developing sleeve and the developer feed/stripping member may greatly be damaged, so that the non-magnetic one-component developer may deteriorate to tend to cause melt adhesion and fog.

In the developing assembly shown in FIG. 4, an elastic control blade 11 made of a material having a rubber elasticity, such as urethane rubber or silicone rubber, or a material having a metal elasticity, such as bronze or stainless steel, is used as the member to control the layer thickness of the non-magnetic one-component developer 4' on the developing sleeve 8. This elastic control blade 11 is brought into pressure touch with the developing sleeve 8 in a posture reverse to the latter's rotational direction, thus a much thin developer layer can be formed on the developing sleeve 8.

This elastic control blade 11 may have a structure wherein a polyamide elastomer (PAE) is stuck to the surface of a phosphor bronze sheet, which can attain a stable pressure. Such a blade may preferably be used especially in order to achieve stable control power and stable charge-providing performance to the developer. The polyamide elastomer (PAE) may include, e.g., copolymers of polyamides with polyethers.

The developer layer thickness control member 11 may come into touch with the developing sleeve 8 at a pressure of from 5 to 50 g/cm as a linear pressure. This is preferable in view of advantages that the developer can stably be controlled and the developer layer thickness can favorably be controlled.

If the developer layer thickness control member 11 comes into touch at a linear pressure of less than 5 g/cm, the developer may be controlled so weakly as to cause fog and developer leak. If it comes into touch at a linear pressure of more than 50 g/cm, the developer may greatly be damaged to tend to cause deterioration of developer or melt-adhesion of developer to the sleeve and blade.

The developer carrying member of the present invention is especially effective when used in an apparatus in which the developer feed/stripping member 13 and the developer layer thickness control member 11 come into pressure contact or touch with the developing sleeve 8.

More specifically, in the case when the developer feed/stripping member 13 and the developer layer thickness control member 11 come into pressure contact or touch with the developing sleeve 8, the developing sleeve 8 stands exposed to service environment where the surface of the developing sleeve 8 more tends to wear, and the developer to melt-adhere thereto, because of these members coming into pressure contact or touch. Thus, the effect to be brought by the developer carrying member of the present invention, having the resin coat layer promising a superior many-sheet running performance, can effectively be brought out.

The developer having a toner, used in the developing assembly incorporated with the developer carrying member of the present invention, is described next.

As the toner preferable in the present invention, it may preferably have a weight average particle diameter of from 4 μm to 11 μm. The use of such a toner brings well balanced charge quantity, image quality and image density.

As a binder resin for the toner, any commonly known resin may be used, which may include, e.g., the following: Vinyl resins, polyester resins, polyurethane resins, epoxy resins and phenolic resins. In particular, vinyl resins and polyester resins are preferred.

For the purpose of improving charge characteristics, a charge control agent may be used in the toner by incorporating the former in toner particles (internal addition) or blending it with toner particles (external addition). This is because the charge control agent enables control of optimum charge quantity in accordance with developing systems.

As a positive charge control agent, it may include the following: Nigrosine, triaminotriphenylmethane dyes, and modified products thereof, modified with a fatty acid metal salt; quaternary ammonium salts such as tributylbenzylammonium 1-hydroxy-4-naphthosulfonate and tetrabutylammonium teterafluoroborate; diorganotin oxides such as dibutyltin oxide, dioctyltin oxide and dicyclohexyltin oxide; and diorganotin borates such as dibutyltin borate, dioctyltin borate and dicyclohexyltin borate. The charge control agent may be used alone or in combination of two or more types.

As a negative charge control agent, an organometallic compound or a chelate compound is effective. As examples thereof, it may include the following: Acetylacetonatoaluminum, acetylacetonatoiron(II), chromium 3,5-di-tertiary-butylsalicylate, acetylacetone metal complexes, monoazo metal complexes, naphthoic acid, and salicylic acid type metal complexes or salts.

Where the toner is a magnetic toner, a magnetic material therefor may include the following: Iron oxide type metal oxides such as magnetite, maghemite and ferrite; and magnetic metals such as Fe, Co and Ni, or alloys of any of these metals with any of metals such as Al, Co, Cu, Pb, Mg, Ni, Sn, Zn, Sb, Be, Bi, Cd, Ca, Mn, Se, Ti, W and V, and mixtures of any of these. Here, any of these magnetic materials may be made to serve also as a colorant.

As a colorant to be incorporated in the toner, any pigment or dye used conventionally in the present field may be used, which may be used under appropriate selection.

A release agent may preferably be incorporated in the toner. The release agent may include the following: Aliphatic hydrocarbon waxes such as low-molecular weight polyethylene, low-molecular weight polypropylene, microcrystalline wax and paraffin wax, waxes composed chiefly of a fatty ester, such as carnauba wax, Fischer-Tropsch wax, sasol wax and montan wax.

In order to improve environmental stability, charging stability, developing performance, fluidity and storage stability and to improve cleaning performance, it is further preferable to externally add to toner particles an inorganic fine powder such as silica, titanium oxide or alumina powder, i.e., to make it present in the vicinity of toner particle surfaces. In particular, fine silica powder is preferred.

External additives other than the inorganic fine powder may further be added. For example, they may include the following: Lubricants such as TEFLON, zinc stearate and polyvinylidene fluoride, and abrasives such as cerium oxide, strontium titanate and strontium silicate. In particular, polyvinylidene fluoride is preferred.

To produce the toner, the binder resin, the pigment or dye as the colorant, the magnetic material and the release agent, and optionally the charge control agent and other additives, are well mixed by means of a mixing machine such as Henschel mixer or a ball mill, then the mixture obtained is melt-kneaded by means of a heat kneading machine such as a heat roll, a kneader or an extruder to make resins melt one another and make the release agent, the pigment or dye and the magnetic material dispersed or dissolved in the molten resins, and the melt-kneaded product obtained is cooled to solidify, followed by pulverization and classification to obtain toner particles. Desired additives may optionally further added, and the materials may sufficiently be mixed by means of a mixing machine such as Henschel mixer to obtain toner particles.

Such toner particles may be used after they have been subjected to sphering treatment or surface smoothing treatment by any method of various types. This is preferable because the toner is improved in transfer performance. To subject the toner particles to sphering treatment or surface smoothing treatment, an apparatus may be used which has an agitating blade and a liner or a casing. For example, a method is available in which toner particle surfaces are smoothed or toner particles are sphered by mechanical force when the toner particles are caused to pass through minute gaps between the blade and the liner; a method in which toner particles are suspended in a heated water to make them spherical; or a method in which toner particles are exposed to hot-air streams to make them spherical.

As a method for producing spherical toner particles directly, a method is available in which a mixture composed chiefly of monomers which are to make the binder resin of the toner is suspended in water to carry out polymerization to obtain a toner. As a specific method, it is a method in which polymerizable monomers, the colorant and a polymerization initiator, and optionally a cross-linking agent, the charge control agent, the release agent and other additives are uniformly dissolved or dispersed to make up a monomer composition, and thereafter this monomer composition is dispersed in water containing a dispersion stabilizer, to have appropriate particle diameter by means of a suitable stirrer, to further carry out polymerization to obtain a toner having the desired particle diameter.

Methods of measuring physical properties concerning the present invention are described below.

(1) How to measure lattice spacing d(002) of graphite (002) plane by X-ray diffraction of carbon black, X-ray diffraction pattern 2θ of carbon black and graphitized particles, and X-ray diffraction pattern 2θ of resin coat layer.

The lattice spacing d(002) of graphite (002) plane by X-ray diffraction of carbon black is measured in the following way. As to the resin coat layer, the resin coat layer formed on the substrate of the developer carrying member is scraped off to obtain a powder, which is used as a measuring sample. As the carbon black and the graphitized particles, these are used as measuring samples as they are.

A sample-horizontal powerful X-ray diffractometer RINT/TTR-II (trade name), manufactured by Rigaku International Corporation, is used as an instrument for measuring the d(002) of the carbon black, the 2θ of the carbon black and graphitized particles each and the 2θ of the resin coat layer.

First, a non-reflecting sample plate is filled with the measuring sample. CuKα rays made monochrome by using a monochrometer are used as a radiation source to obtain an X-ray diffraction chart. From this X-ray diffraction chart, the X-ray diffraction pattern 2θ is determined. The peak position of diffracted beams of the graphite (002) plane of the carbon black is determined from the chart, and the d(002) is calculated according to Bragg's equation shown as Equation (1) below. Here, the wavelength λ of CuKα rays is 0.15418 nm.

$$d(002)=\lambda/2\sin\theta. \qquad \text{Equation (1)}$$

Chief measuring conditions in determining the d(002) of carbon black are as follows.

Chief conditions:
Optical system: Parallel-beam optical system.
Goniometer: Roller horizontal goniometer (TTR-2).
Tube voltage/current: 50 kV/300 mA.
Measuring method: Continuous method.
Scanning axis: 2θ/θ.
Sampling angles: 10° to 50°.
Sampling interval: 0.02°.
Scanning speed: 4°/min.
Divergence slit: Open.
Divergence vertical slit: 10 mm.
Scatter slit: Open.
Receiving slit: 1.00 mm (2) How to measure average primary particle diameter of carbon black.

Photographs of carbon black particles are taken at 60,000 magnifications by using an electron microscope (S4800, trade name; manufactured by Hitachi Ltd.), and the average of length and bread of carbon black particles is regarded as the particle diameter of the particle of carbon black. Where the particle is too small to determine the particle diameter with ease, the photograph taken at 60,000 magnifications is further enlarged to a size of 300,000 magnifications. The above measurement is further made on 100 particles of carbon black, and the value of their 50% median diameter is regarded as the average primary particle diameter of carbon black.

(3) How to measure DBP oil absorption of carbon black.

The DBP oil absorption of carbon black is measured in the following way according to JIS K 6217-1997.

Using a DBP oil absorption measuring instrument (FRONTEX S-410), its damper valve is so regulated that the number of revolutions of the rotor is 125 rpm, the limit switch for torque is set at 5 on its scale and the time taken until the torque scale comes from 10 to 0 is 3 seconds. Then, the rate at which dibutyl phthalate (DBP) is dropwise added is set at 4 ml/min, and 20 g of carbon black is put into an absorptometer's mixing chamber, where the burette counter is adjusted to the point 0 and the DBP is begun to be dropwise added. The scale (V) of the burette counter at the point the torque comes to 5 and the DBP stops being dropwise added is read, and the DBP oil absorption is calculated according to the following equation (2).

$$OA=(V/Wd)\times 100 \qquad \text{Equation (2)}$$

where OA is the DBP oil absorption (ml/100 g) of carbon black, V is the amount (ml) of DBP used until the end point, and Wd is the mass (g) of the carbon black.

(4) How to measure BET specific surface area of carbon black.

The BET specific surface area of carbon black is measured according to what is prescribed in JIS K 6217-2:2001, Method C of "Carbon Black for Rubber, Basic Properties, Second Part; How to Determine Specific Surface Area, Nitrogen Adsorption Method, Single-Point Method".

(5) How to measure volume resistivity of resin coat layer.

A resin coat layer of 7 μm to 20 μm thick is formed on a PET sheet with a thickness of 100 μm. The volume resistivity of the resin coat layer formed is measured with a resistivity meter LORESTAR AP (trade name; manufactured by Mitsubishi Chemical Corporation), using a four-terminal probe. Measured in an environment of 23° C./55% RH.

(6) How to measure weight average particle diameter of toner.

As a measuring instrument, used is Coulter Counter TA-II Model (trade name; manufactured by Beckman Coulter, Inc.). As an electrolytic solution, used is an aqueous 1% by mass NaCl solution prepared by dissolving sodium chloride (first-grade reagent), or ISOTON R-II (trade name; available from Beckman Coulter, Inc.).

As a method of measurement, 0.1 ml to 5 ml of a surface active agent (a dodecylbenzenesulfonate solution) as a dispersant is added to 100 ml to 150 ml of the aqueous electrolytic solution, and then 2 mg to 20 mg of the toner as a sample is added, followed by dispersion for about 1 minute to 3 minutes in an ultrasonic dispersion machine. The volume and number of the measuring sample are measuring by means of the above measuring instrument, using an aperture of 100 μm or an aperture of 30 μm.

From the results of this measurement, volume distribution and number distribution are calculated to determine the weight base, weight average particle diameter (D4) determined from the volume distribution and the number base, number average particle diameter (D1) determined from the number distribution (in the both, the middle value of each channel is used as the representative value for each channel).

(7) How to measure arithmetic-mean roughness (Ra) of developer carrying member surface.

Measured according to JIS B 0601-2001 "Surface Roughness", using surface roughness meter SE-3500 (trade name), manufactured by Kosaka Laboratory, Ltd., and at 3 spots in the axial direction×3 spots in the peripheral direction=9 spots each. Their average value is expressed as Ra. Measured under conditions of a cut-off of 0.8 mm, a measurement distance of 8.0 mm and a feed rate of 0.1 mm/s.

(8) How to measure abrasion wear of resin coat layer.

Abrasion wear (film wear depth) of the resin coat layer is measured with a laser dimension measuring instrument manufactured by KEYENCE Corporation. A controller LS-5500 and a sensor head LS-5040T are used, and a sensor unit is separately fastened to an instrument fitted with a developer carrying member fixture jig and a developer carrying member feed mechanism, where the outer diameter of the developer carrying member is measured. Measured at 30 spots on the developer carrying member, divided into 30 in its lengthwise direction, and further at 30 spots after the developer carrying member is rotated by 90 degrees in the peripheral direction, i.e., at 60 spots in total. Outer diameters were measured at these spots, and their average value is found.

The outer diameter of the developer carrying member before the resin coat layer is formed is previously measured, and the outer diameter is measured after the resin coat layer is formed and after its use in a running test, each. Differences between these are regarded as coat layer thickness and abrasion wear. The outer diameter after the use in a running test is measured after any toner melt-adhering matter having melt-adhered to the developer carrying member surface has been removed by ultrasonic cleaning in methyl ethyl ketone (9) How to measure number average particle diameter of graphitized particles.

The number average particle diameter of the graphitized particles is measured with Coulter LS-230 particle size distribution meter (manufactured by Beckman Coulter, Inc.), which is a laser diffraction particle size distribution meter. As a measuring method, a small-level module is used. As a measuring solvent, isopropyl alcohol (IPA) is used. The inside of a measuring system of the particle size distribution meter is washed with IPA for about 5 minutes, and background function is executed after the washing. Next, 1 mg to 25 mg of a measuring sample is added to 50 ml of IPA. The solution in which the sample has been suspended is subjected to dispersion by means of an ultrasonic dispersion machine for 1 minute to 3 minutes to obtain a sample fluid. The sample fluid is little by little added to the interior of the measuring system of the above measuring instrument, and the sample concentration in the measuring system is adjusted so as to be 45% to 55% as PIDS (polarization intensity differential scattering) on the screen of the instrument to make measurement. Then, number average particle diameter calculated from number distribution is determined.

The present invention is described below in greater detail by giving working examples and comparative examples. Working examples given here by no means limit the present invention. In the following, "%" and "part(s)" used in the working examples and comparative examples refer to "% by mass" and "part(s) by mass", respectively, unless particularly noted.

Production of Carbon Black

A graphite crucible was filled with carbon black (hereinafter also "CB") of 14 nm to 95 nm in average primary particle diameter, which was heat-treated at 2,000° C. to 3,200° C. in an atmosphere of nitrogen gas to carry out graphitization to obtain Graphitized Carbon Blacks (hereinafter also "Graphitized CB") A-1 to A-6. Physical properties of Graphitized Carbon Blacks A-1 to A-6 were measured to show the results in Table 1. In Table 1, the physical properties are also shown in respect of Carbon Blacks a-1 to a-3, not graphitized, and Carbon Black a-4, produced under different conditions for graphitization. At the same time, the temperature in carrying out graphitization is also shown in Table 1.

Here, the carbon blacks not graphitized and the raw-material carbon blacks for the graphitization are as shown below.

CB a-1: TOKA BLACK #5500 (trade name), available from Tokai Carbon Co., Ltd.

CB a-2: KETJEN BLACK EC-300J (trade name), available from Ketjen Black International Company.

CB a-3: DENKA BLACK (trade name), available from Denki Kagaku Kogyo Kabushikikaisha.

Graphitized CB A-1, A-2 and a-4: CB a-1 was used as the raw material.

Graphitized CB A-4: CB a-3 was used as the raw material.

Graphitized CB A-3, A-5 and A-6: SEAST FY SRF-HS (trade name), SEAST SP SRF-LS (trade name) and TOKA BLACK #8500 (trade name), respectively, all available from Tokai Carbon Co., Ltd. were used as the raw materials.

TABLE 1

| Type of carbon black | | Firing temp. in graphitization (° C.) | Lattice spacing of graphited (002) plane (nm) | Position of main peak of 2θ in X-ray diffraction chart (°) | Average primary particle diameter (nm) | DBP oil absorption (ml/100 g) | Nitrogen adsorption specific surface area ($m^2/g$) |
|---|---|---|---|---|---|---|---|
| A-1 | Graphitized CbnBk | 2,400 | 0.3423 | 26.04 | 25 | 120 | 91 |
| A-2 | Graphitized CbnBk | 2,000 | 0.3444 | 25.88 | 25 | 137 | 168 |
| A-3 | Graphitized CbnBk | 3,200 | 0.3378 | 26.39 | 70 | 58 | 26 |
| A-4 | Graphitized CbnBk | 2,400 | 0.3420 | 26.06 | 35 | 150 | 57 |
| A-5 | Graphitized CbnBk | 2,400 | 0.3410 | 26.14 | 95 | 50 | 24 |
| A-6 | Graphitized CbnBk | 2,400 | 0.3433 | 25.96 | 14 | 75 | 180 |
| a-1 | Carbon black | No gr. | 0.3601 | 24.72 | 25 | 154 | 225 |
| a-2 | Carbon black | No gr. | 0.3498 | 25.46 | 40 | 360 | 800 |
| a-3 | Carbon black | No gr. | 0.3464 | 25.72 | 35 | 160 | 68 |
| a-4 | Graphitized CbnBk | 1,500 | 0.3460 | 25.74 | 25 | 145 | 197 |

CbnBk: carbon black
No gr.: No graphitization.

Production of Developer 1

To 900 parts of ion-exchanged water heated to 60° C., 3 parts of tricalcium phosphate was added, these were stirred by means of TK homomixer (manufactured by Tokushu Kika Kogyo Co., Ltd.) at 10,000 rpm to prepare an aqueous medium. Into the aqueous medium obtained, a monomer composition was introduced which was prepared by i) putting into Homogenizer (trade name; manufactured by Nippon Seiki Co., Ltd.) 150 parts of styrene, 50 parts of n-butyl acrylate, 18 parts of a cyan pigment (C.I. Pigment Blue 15:3), 2 parts of a salicylic acid aluminum compound (BONTRON E-88, trade name; available from Orient Chemical Industries, Ltd.), 15 parts of polyester resin (a condensation product of propylene oxide modified bisphenol A with isophthalic acid; glass transition temperature (Tg): 64° C.; weight average molecular weight (Mw): 10,000; number average molecular weight (Mn): 6,000), 30 parts of stearyl stearate wax (main peak as measured with a differential scanning calorimeter DSC: 59° C.) and 0.5 part of divinylbenzene, and heating these to 60° C., followed by stirring at 9,000 rpm to effect dissolution or dispersion, and then ii) dissolving in the mixture obtained 5 parts of a polymerization initiator 2,2'-azobis (2,4-dimethylvaleronitrile). These aqueous medium and monomer composition were stirred at 60° C., in an atmosphere of nitrogen and at 8,000 rpm by means of TK homomixer (trade name; manufactured by Tokushu Kika Kogyo Co., Ltd.) to carry out dispersion.

Thereafter, the reaction mixture obtained was moved to a propeller stirrer and stirred, during which the reaction mixture was heated to 70° C. over a period of 2 hours, and, after 4 hours, further heated to 80° C. at a heating rate of 40° C./hr, where the reaction was carried out at 80° C. for 5 hours to produce polymer particles. After the polymerization reaction was completed, a slurry containing the polymer particles was cooled and then filtered. Thereafter, this was washed with water used in a quantity 10 times the slurry, followed by drying, and thereafter classification to regulate particle diameter to obtain cyan toner particles with a weight average particle diameter (D4) of 6.6 μm.

In 100 parts of the toner particles thus obtained, 1.2 parts of hydrophobic fine silica powder (average primary particle diameter: 7 nm) having been surface-treated with hexamethyldisilazane, 0.15 part of fine rutile titanium oxide powder (average primary particle diameter: 45 nm) and 0.5 part of fine rutile titanium oxide powder (average primary particle diameter: 200 nm) were dry-process mixed for 5 minutes by means of Henschel mixer (manufactured by Mitsui Mining Co. Ltd.) to obtain a non-magnetic one-component developer (Developer 1) having a non-magnetic toner.

Production of Developer 2

74 parts of styrene, 19 parts of n-butyl acrylate, 7 parts of monobutyl maleate and 1 part of di-t-butyl peroxide were dropwise added to 400 parts of refluxed cumene over a period of 5 hours. Thereafter, further under reflux of cumene (140 to 160° C.), the solution polymerization was completed, and then the cumene was removed to obtain a resin.

To a mixture composed of 30 parts of the resin obtained here, 45 parts of styrene, 18 parts of n-butyl acrylate, 10 parts of monobutyl maleate, 0.5 parts of divinylbenzene, 1 part of benzoyl peroxide and 0.5 part of di-t-butyl peroxy-2-ethylhexanoate, 180 parts of water in which 0.8 part of a polyvinyl alcohol partially saponified product was dissolved was added, followed by stirring to prepare a suspension fluid dispersion. Further, 40 parts of water was added thereto, and the resultant suspension fluid dispersion was moved to a reaction vessel the inside of which had been displaced with nitrogen, to carry out suspension polymerization at a reaction temperature of 85° C. for 10 hours. After the reaction was completed, the reaction mixture was filtered and washed, followed by dehydration and drying steps, through which a vinyl resin was obtained.

A mixture of 100 parts of this vinyl resin, 90 parts of magnetite powder, 2 parts of an azo iron complex compound (a negative-charging charge control agent) and 4 parts of a low-molecular weight ethylene-propylene copolymer was melt-kneaded by means of a twin-screw kneading extruder heated to 130° C. The kneaded product obtained was cooled, and thereafter crushed using a hammer mill, and then the crushed product was finely pulverized by means of a fine grinding mill making use of jet air streams. The finely pulverized product obtained was put to simultaneous classification and removal of ultrafine powder and coarse powder by means of a multi-division classifier utilizing the Coanda effect, to obtain toner particles the weight average particle diameter (D4) of which was 6.8 μm.

To 100 parts of the toner particles thus obtained, 1.6 parts of negatively chargeable fine silica powder (BET specific surface area: 300 $m^2/g$) having been hydrophobic-treated with hexamethyldisilazane and dimethylsilicone oil and 0.8 part of strontium titanate were added, and these were mixed by means of Henschel mixer to obtain a magnetic one-component developer (Developer 2) having a magnetic toner.

Production of Developer Carrying Member B-1

166.7 parts of a resol type phenolic resin solution J-325 (trade name; available from Dainippon Ink & Chemicals, Incorporated), containing 40% of methanol, 45 parts of the above Graphitized Carbon Black A-1 and 180 parts of methanol were subjected to dispersion for 2 hours by means of a sand mill (making use of glass beads of 1 mm in diameter). From the fluid dispersion obtained, the glass beads were separated by using a sieve, followed by dilution further with methanol to obtain a coating fluid having a solid content of 30%.

With this coating fluid, a cylindrical tube made of aluminum and having been processed by grinding to have an outer diameter of 16 mm and an arithmetic-mean roughness Ra of 0.7 μm, which was kept to stand upright, masked at its upper and lower end portions and kept rotated at a stated speed, was coated thereon while a spray gun was descended at a stated speed, to form a resin coat layer. Subsequently, this was heated for 30 minutes in a 150° C. hot-air drying furnace to cure the resin coat layer to produce Developer Carrying Member B-1.

Production of Developer Carrying Members B-2 to B-6

Developer Carrying Members B-2 to B-6 were produced in the same manner as Developer Carrying Member B-1 except that Graphitized Carbon Black A-1 was changed for the above Graphitized Carbon Blacks A-2 to A-6, respectively.

Production of Developer Carrying Members b-1 & b-2

Developer Carrying Members b-1 and b-2 were produced in the same manner as Developer Carrying Member B-1 except that the above Carbon Blacks a-1 and a-2, not graphitized, were respectively used in place of Graphitized Carbon Black A-1.

Production of Developer Carrying Members b-3 & b-4

Developer Carrying Members b-3 and b-4 were produced in the same manner as Developer Carrying Member B-1 except that the above Carbon Black a-3 and Graphitized Carbon Black a-4, respectively, were used in place of Graphitized Carbon Black A-1.

Production of Developer Carrying Member B-7

166.7 parts of a resol type phenolic resin solution J-325 (trade name; available from Dainippon Ink & Chemicals, Incorporated), containing 40% of methanol, 37 parts of Graphitized Carbon Black A-1 (produced in Reference Example 1) and 133 parts of methanol were subjected to dispersion for 2 hours by means of a sand mill (making use of glass beads of 1 mm in diameter). From the fluid dispersion obtained, the glass beads were separated by using a sieve, followed by dilution further with methanol to obtain a coating fluid having a solid content of 35%.

With this coating fluid, a cylindrical tube made of aluminum and having been processed by grinding to have an outer diameter of 20 mm and an arithmetic-mean roughness Ra of 0.6 μm, which was kept to stand upright, masked at its upper and lower end portions and kept rotated at a stated speed, was coated thereon while a spray gun was descended at a stated speed, to form a resin coat layer. Subsequently, this was heated at 150° C. for 30 minutes in a hot-air drying furnace to cure the resin coat layer to produce Developer Carrying Member B-7.

Production of Developer Carrying Members B-8 & B-9

Developer Carrying Members B-8 and B-9 were produced in the same manner as Developer Carrying Member B-7 except that Graphitized Carbon Black A-1 was changed for the above Graphitized Carbon Black A-2 and A-3, respectively.

Production of Developer Carrying Members b-5 & b-6

Developer Carrying Members b-5 and b-6 were produced in the same manner as Developer Carrying Member B-7 except that the above Carbon Black a-1 and Graphitized Carbon Black a-4, respectively, were used in place of Graphitized Carbon Black A-1.

The constitution and physical properties of the resin coat layers of Developer Carrying Members B-1 to B-9 and b-1 to b-6 are shown in Table 2.

TABLE 2

| | Resin coat layer | | | | | |
|---|---|---|---|---|---|---|
| | Carbon black | | Position of main peak of 2θ in X = ray diffraction chart (°) | | physical properties | |
| Developer carrying member No. | Type | Amount per 100 parts of binder resin | | Ra (μm) | Layer thickness (μm) | Volume resistivity (Ωcm) |
| B-1 | A-1 | 45 | 26.04 | 0.55 | 8.3 | $4.8 \times 10^0$ |
| B-2 | A-2 | 45 | 25.85 | 0.58 | 8.9 | $8.6 \times 10^0$ |
| B-3 | A-3 | 45 | 26.38 | 0.58 | 8.7 | $2.1 \times 10^0$ |
| B-4 | A-4 | 45 | 26.05 | 0.56 | 8.2 | $4.2 \times 10^0$ |
| B-5 | A-5 | 45 | 26.14 | 0.60 | 8.5 | $3.9 \times 10^0$ |
| B-6 | A-6 | 45 | 25.95 | 0.59 | 9.0 | $5.8 \times 10^0$ |
| B-7 | A-1 | 37 | 26.02 | 0.41 | 12.3 | $6.4 \times 10^1$ |
| B-8 | A-2 | 37 | 25.85 | 0.39 | 13.0 | $2.1 \times 10^2$ |
| B-9 | A-3 | 37 | 26.38 | 0.40 | 13.2 | $2.8 \times 10^1$ |
| b-1 | a-1 | 45 | *1 | 0.57 | 8.4 | $9.3 \times 10^0$ |
| b-2 | a-2 | 45 | *1 | 0.56 | 8.3 | $3.9 \times 10^0$ |
| b-3 | a-3 | 45 | 25.71 | 0.59 | 8.6 | $6.4 \times 10^0$ |
| b-4 | a-4 | 45 | 25.75 | 0.54 | 9.0 | $7.8 \times 10^0$ |
| b-5 | a-1 | 37 | *1 | 0.42 | 12.7 | $7.4 \times 10^2$ |
| b-6 | a-4 | 37 | 25.74 | 0.40 | 13.1 | $4.6 \times 10^2$ |

*1 Not measurable.

EXAMPLE 1

Developer Carrying Member B-1 was evaluated in the following way, using an altered machine of a commercially available laser beam printer LBP-2510 (trade name; manufactured by CANON INC.).

First, from a cyan cartridge EP-85 (trade name; manufactured by CANON INC.) for LBP-2510, its charging auxiliary roller fitted on the developer carrying member was detached, the cyan cartridge was filled with Developer 1, and further Developer Carrying Member B-1 was set in. Also, rollers attached to the right and left of the developer carrying member were changed for those having larger size to change the gap distance between the developer carrying member and the photosensitive drum to 280 μm. This altered cyan cartridge was fitted to the cyan station of the printer LBP-2510, and dummy cartridges were fitted to other stations, where monochrome evaluation was made.

The developing assembly was schematically like that as illustrated in FIG. 4. As its elastic control blade (hereinafter also "blade") which is the developer layer thickness control member, used was a blade consisting of a phosphor bronze plate and provided on its surface a rubber layer having a thickness of 30 μm and formed of a polyamide elastomer.

Development was performed under conditions making use of conditions for jumping development as shown below.

The dark-area potential (Vd) at non-image areas of the photosensitive drum was set to −500 V; and the light-area potential (V1) of image areas where electrostatic latent images are to be formed, to −100 V.

Further, as development bias voltage, a voltage formed by superimposing on a DC bias of −250 V an AC bias voltage of 1.8 kV as peak-to-peak voltage (Vpp) and composed of a rectangular wave of 3.5 kHz frequency was used to perform jumping development.

As evaluation environments, three environments of a low-temperature and low-humidity environment (L/L) of 15° C./10% RH, a normal-temperature and normal-humidity environment (N/N) of 23° C./60% RH and a high-temperature and high-humidity environment of 30° C./85% RH were taken up. Images were reproduced on up to 6,000 sheets (running test) to make evaluation on image quality (image density, fog, halftone uniformity and vertical streaks), and wear resistance (abrasion wear) and contamination resistance of the developer carrying member surface.

(1-1) Image Density

In the image reproduction tests, solid images were reproduced at the initial stage (5th sheet) and at the finish of running test (6,000th sheet). Their image densities were measured at 10 spots, and the average value thereof was found to regard it as image density. Its relative density with respect to an image of the white background area of an original having an image density of 0.00 was measured. From the results obtained, evaluation was made according to the following criteria. Macbeth Reflection Densitometer RD918 (trade name; manufactured by Macbeth Co.) was used in measuring the image density.

A: 1.40 or more.
B: 1.35 or more to less than 1.40.
C: 1.00 or more to less than 1.35.
D: Less than 1.00.

(1-2) Fog

Fog density (%) was calculated from the difference between the whiteness of white background areas of printed images and the whiteness of a transfer sheet as measured with a fog measuring instrument (trade name: REFLECTOMETER MODEL TC-6DS; manufactured by Tokyo Denshoku Co., Ltd.). Image fog at the initial stage (5th sheet) and at the finish of running test (6,000th sheet) were evaluated according to the following criteria. As a filter, an amber light filter was used.

A: Less than 0.5%.
B: 0.5% or more to less than 1.0%.
C: 1.0% or more to less than 1.5%.
D: 1.5% or more.

(1-3) Halftone Uniformity (Tone Non-uniformity)

Any tone non-uniformity which may appear in halftone areas of images printed at the initial stage (5th sheet) and at the finish of running test (6,000th sheet) was visually observed to make evaluation according to the following criteria.

A: No tone non-uniformity is seen at all on images.
B: Tone non-uniformity is slightly seen when viewed carefully.
C: Tone non-uniformity is slightly seen.
D: A little conspicuous tone non-uniformity is seen.
D: Conspicuous tone non-uniformity is seen over the whole images.

(1-4) Vertical Streaks

As to vertical streaks which may linearly extend in the direction of progress of image formation, solid images were reproduced at the initial stage (5th sheet) and at the finish of running test (6,000th sheet), and thereafter the developer coat layer on the developer carrying member was observed at each stage. As to such solid images and also the halftone images of the item (1-3), these were visually observed to make evaluation according to the following criteria.

A: No vertical streak is seen on both the developer coat layer on developer carrying member and the images.

B: Vertical streaks are slightly seen on the developer coat layer on developer carrying member, but no vertical streak is seen at all on the images.

C: Slender vertical streaks are seen on the developer coat layer on developer carrying member, and are slightly seen on the halftone images as well.

D: Clear vertical streaks are seen on the developer coat layer on developer carrying member, and are slightly seen on the solid images but conspicuously on the halftone images.

E: Melt-adherent thick vertical streaks are seen on the developer coat layer on developer carrying member, and conspicuous lines are seen on the solid images as well.

(1-5) Wear Resistance of Resin Coat Layer

The layer thickness of the resin coat layer of each developer carrying member was measured before use and after running test to determine the abrasion wear of the resin coat layer to thereby evaluate its wear resistance.

(1-6) Contamination Resistance of Resin Coat Layer

The developer carrying member surface after running test was observed at about 200 magnifications on an ultra-depth profile measuring microscope manufactured by KEYENCE Corporation. On the extent of contamination, evaluation was made according to the following criteria.

A: Only slight contamination is observable.

B: Contamination is a little observable.

C: Contamination is partially observable, and part of the contamination toner stands melt-adhering to the surface in the shape of very small particles.

D: Contamination is observable over the whole surface, and the greater part of the contamination toner stands melt-adhering to the surface in the shape of a little small and slender particles.

E: Contamination toner stands melt-adhering to the whole surface in the shape of large and slender particles.

The results of the above evaluation on image quality (image density, fog, halftone uniformity and vertical streaks), and wear resistance and contamination resistance of the developer carrying member surface are shown in Table 3.

EXAMPLES 2 TO 6 AND COMPARATIVE EXAMPLES 1 TO 4

Developer carrying members were each set in the cartridge in the same manner as in Example 1 except that Developer Carrying Members B-2 to B-6 and b-1 to b-4, respectively, were used as the developer carrying members. Subsequently, images and so forth were evaluated in the same way as in Example 1. The results are shown in Table 3.

TABLE 3

| | Developer | | Image density | | Fog | | Halftone uniformity | | Vertical streaks | | Wear resist., abrasion | |
|---|---|---|---|---|---|---|---|---|---|---|---|---|
| | carrying member | Evaluation environment | Initial stage | 6,000 sheets | Initial stage | 6,000 sheets | Initial stage | 6,000 sheets | Initial stage | 6,000 sheets | wear (μm) | Contamination resistance |
| Example: | | | | | | | | | | | | |
| 1 | B-1 | N/N | A | A | A | A | A | A | A | A | 0.8 | A |
| | | H/H | A | A | A | A | A | A | A | B | 1.1 | A |
| | | L/L | A | A | A | B | A | B | A | A | 0.6 | A |
| 2 | B-2 | N/N | A | A | A | B | A | B | A | B | 1.1 | B |
| | | H/H | A | C | A | C | A | B | A | C | 1.5 | C |
| | | L/L | A | B | A | B | A | C | A | B | 0.9 | B |
| 3 | B-3 | N/N | A | A | A | A | A | A | A | A | 1.2 | A |
| | | H/H | A | A | A | A | A | B | A | A | 1.7 | A |
| | | L/L | A | A | A | A | A | A | A | A | 0.8 | A |
| 4 | B-4 | N/N | A | A | A | A | A | A | A | A | 1.1 | A |
| | | H/H | A | A | A | B | A | B | A | B | 1.5 | A |
| | | L/L | A | A | A | B | A | B | A | B | 0.8 | B |
| 5 | B-5 | N/N | A | A | A | A | A | A | A | A | 1.3 | A |
| | | H/H | A | B | A | B | A | B | A | B | 1.8 | B |
| | | L/L | A | B | A | B | A | B | A | B | 1.1 | B |
| 6 | B-6 | N/N | A | A | A | A | A | B | A | B | 1.4 | B |
| | | H/H | A | B | A | C | A | B | A | B | 2.1 | B |
| | | L/L | A | B | A | B | A | C | A | B | 1.3 | B |
| Comparative Example: | | | | | | | | | | | | |
| 1 | b-1 | N/N | A | C | A | B | A | D | A | C | 2.2 | C |
| | | H/H | A | C | B | D | B | D | A | E | 2.7 | E |
| | | L/L | B | D | A | D | B | E | A | D | 1.9 | D |
| 2 | b-2 | N/N | A | C | B | C | A | D | A | C | 2.8 | C |
| | | H/H | B | D | B | D | B | E | A | E | 3.3 | E |
| | | L/L | B | D | B | C | B | E | A | E | 2.4 | D |
| 3 | b-3 | N/N | A | B | A | B | A | C | A | B | 2.3 | B |
| | | H/H | A | C | B | D | B | D | A | D | 2.8 | D |
| | | L/L | B | C | A | C | A | D | A | C | 2.0 | D |
| 4 | b-4 | N/N | A | B | A | B | A | B | A | B | 1.8 | B |
| | | H/H | A | B | A | C | B | D | A | C | 2.5 | D |
| | | L/L | A | C | A | C | A | C | A | C | 1.5 | C |

EXAMPLE 7

A magnet roller was inserted into Developer Carrying Member B-7, and flanges were attached to both ends. The developer carrying member thus obtained was set in the developing assembly of a digital copying machine GP-405 (trade name; manufactured by CANON INC.), and its developer container was filled with Developer 2 and then images were reproduced.

The developing assembly was schematically like that as illustrated in FIG. 1. A magnetic blade (material: SUS stainless steel) of 0.6 mm in thickness was used as the developer layer thickness control member. The rotational speed of the developing sleeve was set at 140% in relative speed with respect to the rotational speed of the photosensitive drum.

As evaluation environments, three environments of a low-temperature and low-humidity environment (L/L) of 15° C./10% RH, a normal-temperature and normal-humidity environment (N/N) of 23° C./60% RH and a high-temperature and high-humidity environment of 30° C./85% RH were taken up. Copies were taken on up to 700,000 (70 k) sheets (running test) to make evaluation on image quality (image density, fog, halftone uniformity and sleeve ghosts), and wear resistance (abrasion wear) and contamination resistance of the developer carrying member surface.

(2-1) Image density

In the copying tests, solid images were reproduced at the initial stage (20th sheet) and at the finish of running test. Their image densities were measured at 10 spots, and the average value thereof was found to regard it as image density. Its relative density with respect to an image of the white background area of the original having an image density of 0.00 was measured. From the results obtained, evaluation was made according to the following criteria. Macbeth Reflection Densitometer RD918 (trade name; manufactured by Macbeth Co.) was used in measuring the image density.

A: 1.40 or more.
B: 1.35 or more to less than 1.40.
C: 1.00 or more to less than 1.35.
D: Less than 1.00.

(2-2) Fog

Fog density (%) was calculated from the difference between the whiteness of white background areas of copied images and the whiteness of a transfer sheet as measured with a fog measuring instrument (trade name: REFLECTOMETER MODEL TC-6DS; manufactured by Tokyo Denshoku Co., Ltd.). Image fog at the initial stage (20th sheet) and at the finish of running test were evaluated according to the following criteria.

A: Less than 1.0%.
B: 1.0% or more to less than 2.0%.
C: 2.0% or more to less than 3.0%.
D: 3.0% or more.

(2-3) Halftone Uniformity (Tone Non-uniformity)

Any misty tone non-uniformity which may appear in halftone areas of images copied at the initial stage (20th sheet) and at the finish of running test was visually observed to make evaluation according to the following criteria.

A: No tone non-uniformity is seen at all on images.
B: Tone non-uniformity is slightly seen when viewed carefully.
C: Tone non-uniformity is slightly seen.
D: A little conspicuous tone non-uniformity is seen.
E: Conspicuous tone non-uniformity is seen over the whole images.

(2-4) Sleeve Ghosts

Figure 5:
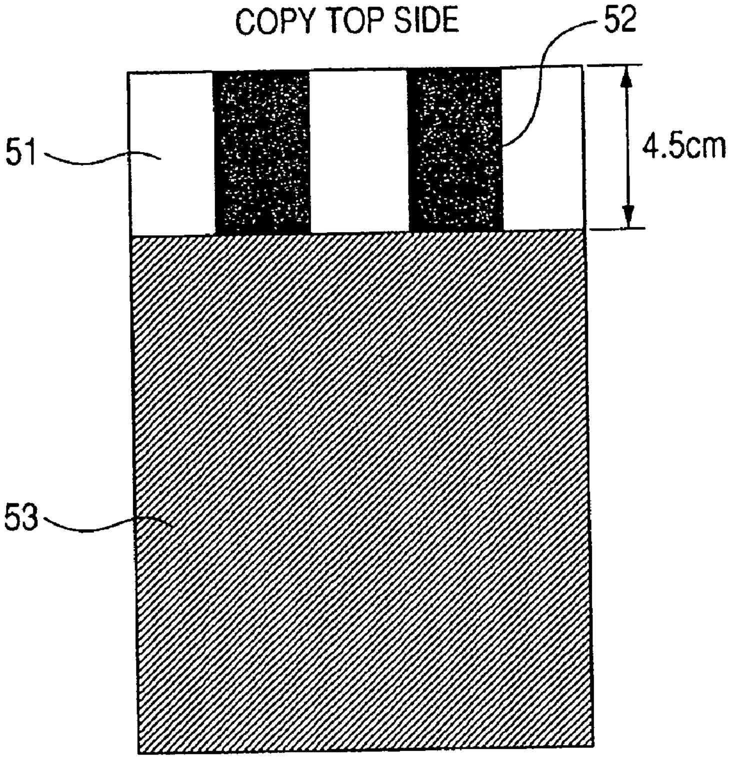
FIG. 5 is a view showing a standard chart (making use of A4-size sheet) for making evaluation on sleeve ghosts.

Images were reproduced at the initial stage (20th sheet) and at the finish of running test, using a standard chart making use of A4-size sheet in which, as shown in FIG. 5, there are solid white areas 51 and solid black areas 52 which adjoin one another, at the top (leading edge) portion in a width of 4.5 cm, and subsequently thereto there is a halftone area 53. The difference in tone that appeared on the halftone image obtained was visually observed to make evaluation according to the following criteria.

A: No difference in tone is seen at all.
B: A slight difference in tone is seen.
C: A difference in tone is a little seen, but images are tolerable in practical use.
D: A conspicuous difference in tone is seen in a width within 4.5 cm.
E: A conspicuous difference in tone is seen in a width beyond 4.5 cm.

(2-5) Wear Resistance of Resin Coat Layer

The layer thickness of the resin coat layer of each developer carrying member was measured before use and after running test to determine the abrasion wear of the resin coat layer to thereby evaluate its wear resistance.

(2-6) Contamination Resistance of Resin Coat Layer

The developer carrying member surface after running test was observed at about 200 magnifications on an ultra-depth profile measuring microscope manufactured by KEYENCE Corporation. On the extent of contamination, evaluation was made according to the following criteria.

A: Only slight contamination is observable.
B: Contamination is a little observable.
C: Contamination is partially observable, and part of the contamination toner stands melt-adhering to the surface in the shape of very small particles.
D: Contamination is observable over the whole surface, and the greater part of the contamination toner stands melt-adhering to the surface in the shape of a little small and slender particles.
E: Contamination toner stands melt-adhering to the whole surface in the shape of large and slender particles.

The results of the above evaluation on image quality (image density, fog, halftone uniformity and vertical streaks), and wear resistance and contamination resistance of the developer carrying member surface are shown in Table 4.

EXAMPLES 8 AND 9 AND COMPARATIVE EXAMPLES 5 AND 6

Developer carrying members were each set in the cartridge in the same manner as in Example 1 except that Developer Carrying Members B-8 to B-9 and b-5 and b-6, respectively, were used as the developer carrying members. Subsequently, images and so forth were evaluated in the same way as in Example 7. The results are shown in Table 4.

TABLE 4

| | Developer carrying member | Environment | Image density Initial stage | Image density 70k sheets | Fog Initial stage | Fog 70k sheets | Halftone uniformity Initial stage | Halftone uniformity 70k sheets | Sleeve ghosts Initial stage | Sleeve ghosts 70k sheets | Resin coat layer abrasion wear (μm) | Contamination resistance |
|---|---|---|---|---|---|---|---|---|---|---|---|---|
| Example: | | | | | | | | | | | | |
| 7 | B-7 | N/N | A | A | A | A | A | A | A | A | 1.8 | A |
| | | H/H | A | A | A | A | A | A | A | A | 2.1 | A |
| | | L/L | A | A | A | B | A | B | A | B | 1.4 | B |
| 8 | B-8 | N/N | A | A | A | A | A | A | A | A | 1.8 | A |
| | | H/H | A | B | A | B | A | B | A | B | 2.4 | B |
| | | L/L | A | B | A | C | A | C | A | C | 1.6 | B |
| 9 | B-9 | N/N | A | A | A | A | A | A | A | A | 1.9 | A |
| | | H/H | A | A | A | A | A | A | A | A | 2.5 | A |
| | | L/L | A | A | A | A | A | A | A | A | 1.7 | A |
| Comparative Example: | | | | | | | | | | | | |
| 5 | b-5 | N/N | A | B | A | C | A | B | A | C | 2.6 | B |
| | | H/H | B | D | B | D | B | D | A | D | 3.4 | D |
| | | L/L | B | D | A | D | A | E | B | E | 2.5 | D |
| 6 | b-6 | N/N | A | B | A | B | A | B | A | B | 2.5 | B |
| | | H/H | B | C | B | C | B | C | A | C | 3.1 | D |
| | | L/L | A | C | A | D | A | D | B | D | 2.3 | C |

Production of Graphitized Particles X-1

Mesocarbon microbeads obtained by heat treatment of coal type heavy oil were washed and then dried, and thereafter the dried product was mechanically dispersed by means of an atomizer mill, followed by primary heat treatment at 800° C. in an atmosphere of nitrogen to effect carbonization. Next, the carbonized beads were subjected to secondary dispersion by means of the atomizer mill, followed by heat treatment at 2,400° C. in an atmosphere of nitrogen, and further followed by classification to obtain graphitized particles with a number average particle diameter of 5.8 μm, which were collected to obtain Graphitized Particles X-1.

Production of Graphitized Particles X-2

β-resin was extracted from coal-tar pitch by solvent fractionation and this was hydrogenated to carry out heavy-duty treatment. Thereafter, the solvent-soluble matter was removed with toluene to obtain mesophase pitch. The mesophase pitch was finely pulverized, and the resultant particles were subjected to oxidation treatment at about 800° C. in air, followed by heat treatment at 2,000° C. in an atmosphere of nitrogen, and further followed by classification to obtain graphitized particles with a number average particle diameter of 3.1 μm, which were collected to obtain Graphitized Particles X-2.

Production of Graphitized Particles X-3 and X-4

Graphitized particles with number average particle diameters of 5.9 μm (Graphitized Particles X-3) and 5.3 μm (Graphitized Particles X-4) were produced in the same manner as Graphitized Particles X-2 except that firing temperature and classification conditions were changed.

Physical properties of Graphitized Particles X-1 to X-4 produced as described above were measured, which were as shown in Table 5.

TABLE 5

| Graphitized particles No.: | Raw material | Firing temp. in graphitization (° C.) | Lattice spacing of graphited (200) plane (nm) | Position of main peak of 2θ in X-ray diffraction chart (°) | Volume average particle diameter (μm) |
|---|---|---|---|---|---|
| X-1 | Mesocarbon microbeads | 2,400 | 0.3405 | 26.18 | 5.8 |
| X-2 | Bulk mesophase pitch particles | 2,000 | 0.3444 | 25.87 | 3.1 |
| X-3 | Bulk mesophase pitch particles | 2,600 | 0.3372 | 26.44 | 5.9 |
| X-4 | Bulk mesophase pitch particles | 3,200 | 0.3358 | 26.55 | 5.3 |

Production of Developer 3

20 mol % of phthalic acid, 20 mol % of n-dodecenylsuccinic acid, 7 mol % of 1,2,4-benzenetricarboxylic acid and 53 mol % of ethylene oxide addition bisphenol A were introduced into a four-necked flask. A reflux condenser, a water separator, an $N_2$ gas feed pipe, a thermometer and a stirrer were attached to the flask, and, while $N_2$ gas was fed into the flask, condensation polymerization was carried out at 180° C. After the reaction was completed, the reaction product was washed with water, followed by dehydration and drying steps, through which a polyester type resin (2) was obtained.

Next, in 100 parts of the polyester type resin (2), 85 parts of magnetite powder, 2 parts of an azo iron complex compound (a negative-charging charge control agent) and 5 parts of Fischer-Tropsch wax were mixed, followed by the same procedure as Production of Developer 2 to obtain toner particles to obtain toner particles the weight average particle diameter (D4) of which was 7.4 μm.

To 100 parts of the toner particles thus obtained, 1.2 parts of negatively chargeable fine silica powder (BET specific surface area: 300 $m^2/g$) having been treated with hexamethyldisilazane and 4.0 parts of strontium titanate were added, and these were mixed by means of Henschel mixer to obtain a negatively chargeable magnetic one-component developer (Developer 3) having a magnetic toner.

Production of Developer 4

600 g of terephthalic acid, 600 g of trimellitic anhydride, 330 g of fumaric acid, 1,050 g of propoxylated bisphenol A (PO-BPA), 450 g of ethoxylated bisphenol A (EO-BPA) and 183 g of a hydrocarbon wax (melting point: 100° C.) were introduced into a four-necked flask together with an esterifying catalyst. A vacuum device, a water separator, a nitrogen gas feeder, a temperature measuring device and a stirrer were attached to the flask. To a polyester monomer mixture kept stirred at 130° C. in an atmosphere of nitrogen, a vinyl polymer monomer mixture (510 g of styrene, 112 g of 2-ethylhexyl acrylate and 0.13 g of divinyl benzene) was dropwise added from a dropping funnel over a period of 4 hours. This was kept at 130° C. for 3 hours, and thereafter heated to 230° C. to carry out reaction. After the reaction was completed, the reaction product was taken out of the flask, followed by cooling and then pulverization to obtain a hybrid resin (3) composed of a hybrid resin component having a polyester unit and a vinyl polymer unit and having a softening point of 130° C.

100 parts of this hybrid resin (3), 80 parts of magnetite powder, 2 parts of an azo iron complex compound (a negative-charging charge control agent) and 4 parts of a polyethylene wax were mixed by means of Henschel mixer, and thereafter melt-kneaded and dispersed by means of a twin-screw extruder to obtain a kneaded product. This was cooled and thereafter crushed by using a cutter mill, and then the crushed product obtained was finely pulverized by means of a mechanical grinding machine Turbo mill (manufactured by Turbo Kogyo Co., Ltd.; the surfaces of its rotator and stator were coated by plating of a chromium alloy containing chromium carbide). The finely pulverized product obtained was classified by means of a multi-division classifier to obtain a fine powder the weight average particle diameter (D4) of which was 5.1 μm.

Next, to 100 parts of this fine powder, 1.5 parts of hydrophobic colloidal silica having been treated with hexamethyldisilazane and dimethylsilicone oil and 0.5 part of strontium titanate were added, and these were mixed by means of Henschel mixer to obtain a negatively chargeable magnetic one-component developer (Developer 4) having a magnetic toner.

Unevenness-providing particles to be contained in the resin coat layer are shown together in Table 6.

TABLE 6

| Unevenness-providing particles No. | Material | Number average particle diam. (μm) |
|---|---|---|
| Y-1 | Melamine resin particles OPTBEADS 6500M (trade name; available from Nissan Chemical Industries, Ltd.) | 6.5 |

TABLE 6-continued

| Unevenness-providing particles No. | Material | Number average particle diam. (μm) |
|---|---|---|
| Y-2 | Melamine resin particles OPTBEADS 10500M (trade name; available from Nissan Chemical Industries, Ltd.) | 10.5 |

EXAMPLE 10

166.7 parts (solid content: 100 parts) of a resol type phenolic resin solution J-325 (trade name; available from Dainippon Ink & Chemicals, Incorporated), containing 40% of methanol, 35 parts of Graphitized Particles X-1, 10 parts of Graphitized Carbon Black A-1, 10 parts of Unevenness-providing Particles Y-2 and 180 parts of methanol were subjected to dispersion for 2 hours by means of a sand mill (making use of glass beads of 1 mm in diameter as media particles). From the fluid dispersion obtained, the glass beads were separated by using a sieve, followed by dilution further with methanol to obtain a coating fluid having a solid content of 33%.

Developer Carrying Member S-1 was produced in the same manner as in Example 1 except that the above coating fluid was used and that a cylindrical tube made of aluminum and having been processed by grinding to have an outer diameter of 24.5 mm and a center-line mean roughness Ra of 0.52 μm was used as the cylindrical tube. The resin coat layer of Developer Carrying Member S-1 was in a layer thickness of 13 μm. The formulation and physical properties of the resin coat layer of this Developer Carrying Member S-1 are shown in Table 7.

A magnet roller was inserted into Developer Carrying Member S-1 obtained, and flanges were attached to both ends. This was set in the developing assembly of a digital copying machine IR 6010 (trade name; for 230V machine), manufactured by CANON INC., the developer carrying member of which was an OPC drum.

Using as a developer the negatively chargeable magnetic one-component developer (Developer 3) having a magnetic toner, images were reproduced on 1,000,000 (100k) sheets in an intermittent mode of one sheet per 10 seconds. Images on the 100th sheet in that course were regarded as an image reproduction result at the initial stage and images on the 1,000,000th sheet as an image reproduction result at the finish of running, to evaluate the images. In making this evaluation, the images were reproduced in a normal-temperature and normal-humidity environment (23° C./50% RH; N/N). The image evaluation was made on image density, fog, blotches, sleeve ghosts, halftone uniformity, image quality and resin coat layer wear resistance. In regard to the image density, fog, sleeve ghosts, halftone uniformity and resin coat layer wear resistance, evaluation was made in the same way as the above items (2-1) to (2-5) except for the number of sheets at the initial stage and at the finish of running and for environmental conditions in the running test. In regard to the blotches and image quality, evaluation was made in the following way. Evaluation results obtained are shown in Tables 8 and 9.

(3-1) Blotches

The whole images formed by copying at the initial stage and at the finish of running test each and any faulty toner coating on the developer carrying member such as wavy toner non-uniformity on the developer carrying member and faulty images such as blotches (spotty non-uniformity) during the copying were visually observed to make evaluation according to the following criteria.

A: No fault is seen at all both on images and on the developer carrying member.

B: Faults are slightly seen on the developer carrying member, but little seen on images.

C: Faulty images are seen on halftone images or solid black images.

D: Faulty images are seen on the whole solid black images.

E: Faulty images are seen on solid white images as well.

(3-2) Image Quality

At the initial stage and at the finish of running test, spots around line images and blurred images were examined on copied images of a character "電" of 2.5 mm in length and width to make evaluation according to the following criteria.

A: Images are sharp which are free of any spots around line images even when viewed with a magnifier of 10 magnifications.

B: Images are sharp as long as they are visually observed.

C: Spots around line images are somewhat seen.

D: Besides spots around line images, blurred images are conspicuous.

EXAMPLE 11

Developer Carrying Member S-2 was produced in the same manner as in Example 10 except that the amounts of Graphitized Particles X-1 and Graphitized Carbon Black A-1 used in Example 10 were changed to 42 parts and 2 parts, respectively. Evaluation was made in the same way as in Example 10. The formulation and physical properties of the resin coat layer of this Developer Carrying Member S-2 are shown in Table 7, and the results of evaluation in Tables 8 and 9.

EXAMPLE 12

To prepare a coating fluid, 166.7 parts (solid content: 100 parts) of a resol type phenolic resin solution J-325 (trade name; available from Dainippon Ink & Chemicals, Incorporated), containing 40% of methanol, 35 parts of Graphitized Particles X-3, 10 parts of Graphitized Carbon Black A-5, 10 parts of Unevenness-providing Particles Y-1, 5 parts of a quaternary ammonium salt formed by compounds of the following formulas (A) and (B).

(A)

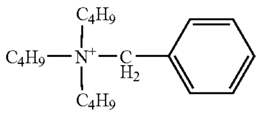

(B)

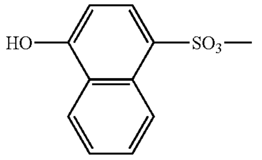

and 200 parts of methanol were subjected to dispersion for 2 hours by means of a sand mill (making use of glass beads of 1 mm in diameter as media particles). From the fluid dispersion obtained, the glass beads were separated by using a sieve, followed by dilution further with methanol to obtain a coating fluid having a solid content of 33%. Developer Carrying Member S-3 was produced in the same manner as in Example 10 except that this coating fluid was used. Evaluation was made in the same way as in Example 10. The formulation and physical properties of the resin coat layer of this Developer Carrying Member S-3 are shown in Table 7, and the results of evaluation in Tables 8 and 9.

EXAMPLE 13

To prepare a coating fluid, 166.7 parts (solid content: 100 parts) of a resol type phenolic resin solution J-325 (trade name; available from Dainippon Ink & Chemicals, Incorporated), containing 40% of methanol, 20 parts of Graphitized Particles X-2, 25 parts of Graphitized Carbon Black A-4, 10 parts of Unevenness-providing Particles Y-2, 5 parts of a quaternary ammonium salt formed by the compounds of the above formulas (A) and (B) and 200 parts of methanol were subjected to dispersion for 2 hours by means of a sand mill (making use of glass beads of 1 mm in diameter as media particles). From the fluid dispersion obtained, the glass beads were separated by using a sieve, followed by dilution further with methanol to obtain a coating fluid having a solid content of 33%. Developer Carrying Member S-4 was produced in the same manner as in Example 10 except that this coating fluid was used. Evaluation was made in the same way as in Example 10. The formulation and physical properties of the resin coat layer of this Developer Carrying Member S-4 are shown in Table 7, and the results of evaluation in Tables 8 and 9.

EXAMPLE 14

Developer Carrying Member S-5 was produced in the same manner as in Example 10 except that Graphitized Carbon Black A-2 was used in an amount of 10 parts in place of Graphitized Carbon Black A-1 and Graphitized Particles X-2 in an amount of 5 parts in place of Graphitized Particles X-1. Evaluation was made in the same way as in Example 10. The formulation and physical properties of the resin coat layer of this Developer Carrying Member S-5 are shown in Table 7, and the results of evaluation in Tables 8 and 9. Here, in the evaluation test, a negatively chargeable magnetic one-component developer (Developer 4) having a magnetic toner was used as the developer.

EXAMPLE 15

Developer Carrying Member S-6 was produced in the same manner as in Example 14 except that Graphitized Carbon Black A-3 was used in an amount of 10 parts in place of Graphitized Carbon Black A-2. Evaluation was made in the same way as in Example 14. The formulation and physical properties of the resin coat layer of this Developer Carrying Member S-6 are shown in Table 7, and the results of evaluation in Tables 8 and 9.

EXAMPLE 16

Developer Carrying Member S-7 was produced in the same manner as in Example 10 except that Graphitized Carbon Black A-6 was used in an amount of 10 parts in place of Graphitized Carbon Black A-1 and Graphitized Particles X-4 in an amount of 35 parts in place of Graphitized Particles X-1. Evaluation was made in the same way as in Example 10. The formulation and physical properties of the resin coat layer of this Developer Carrying Member S-7 are shown in Table 7, and the results of evaluation in Tables 8 and 9.

TABLE 7

| Developer carrying member No. | Carbon black Type | Carbon black *Amt. | Graphitized particles Type | Graphitized particles *Amt. | Resin coat layer physical properties 2θ in X-ray diffraction chart: Position of main peak (°) | Position of half width of main peak (°) | Position of Sub-peak (°) | Ra (μm) | Layer thickness (μm) | Volume resistivity (Ωcm) |
|---|---|---|---|---|---|---|---|---|---|---|
| S-1 | A-1 | 10 | X-1 | 35 | 26.16 | 26.14 to 26.18 | — | 0.52 | 13.0 | 0.92 |
| S-2 | A-1 | 2 | X-1 | 42 | 26.17 | 26.15 to 26.18 | — | 0.55 | 13.7 | 1.05 |
| S-3 | A-5 | 10 | X-3 | 35 | 26.36 | 26.42 to 26.46 | — | 0.81 | 13.4 | 1.08 |
| S-4 | A-4 | 25 | X-2 | 20 | 25.86 | 25.67 to 25.70 | 26.15 | 0.94 | 12.7 | 1.38 |
| S-5 | A-2 | 10 | X-2 | 5 | 25.62 | 25.59 to 25.64 | — | 0.49 | 13.5 | 0.97 |
| S-6 | A-3 | 10 | X-2 | 5 | 25.68 | 25.65 to 25.71 | — | 0.48 | 13.8 | 0.89 |
| S-7 | A-6 | 10 | X-4 | 35 | 26.51 | 26.49 to 26.53 | — | 0.43 | 13.1 | 1.06 |

*Amount (part) based on 100 parts of binder resin

TABLE 8

| Example: | Developer carrying member | Evaluation environment | Image density Initial stage | Image density 100k sheets | Fog Initial stage | Fog 100k sheets | Blotches Initial stage | Blotches 100k sheets | Sleeve ghosts Initial stage | Sleeve ghosts 100k sheets |
|---|---|---|---|---|---|---|---|---|---|---|
| 10 | S-1 | N/N | A | A | A | A | A | A | A | A |
| 11 | S-2 | N/N | A | A | B | B | A | A | B | C |
| 12 | S-3 | N/N | A | A | A | A | A | A | A | A |
| 13 | S-4 | N/N | B | A | A | A | A | B | B | A |
| 14 | S-5 | N/N | B | B | A | A | A | A | B | B |
| 15 | S-6 | N/N | A | A | A | A | A | A | A | A |
| 16 | S-7 | N/N | A | A | B | B | A | A | A | B |

TABLE 9

| Example: | Developer carrying member | Evaluation environment | Halftone uniformity Initial stage | Halftone uniformity 1,000,000 sheets | Image quality Initial stage | Image quality 1,000,000 sheets | Wear resistance, abrasion wear (μm) |
|---|---|---|---|---|---|---|---|
| 10 | S-1 | N/N | A | A | B | B | 3.9 |
| 11 | S-2 | N/N | B | B | A | B | 4.2 |
| 12 | S-3 | N/N | B | B | A | A | 3.1 |
| 13 | S-4 | N/N | A | A | A | B | 2.4 |
| 14 | S-5 | N/N | B | A | B | A | 3.5 |
| 15 | S-6 | N/N | A | A | A | A | 3.8 |
| 16 | S-7 | N/N | A | A | B | B | 6.7 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priorities from Japanese Patent Application No. 2005-211658 filed on Jul. 21, 2005 and Japanese Patent Application No. 2005-211681 filed on Jul. 21, 2005, the contents of which are incorporated hereinto by reference.

What is claimed is:

1. A developer carrying member which holds thereon a developer having a toner for developing an electrostatic latent image held on an electrostatic latent image bearing member, wherein;

said developer carrying member has at least a substrate and a resin coat layer on the surface of the substrate; and said resin coat layer contains at least a binder resin and a carbon black, wherein said carbon black is graphitized carbon black and has a lattice spacing of the graphite (002) plane measured by X-ray diffraction of from 0.3370 nm or more to 0.3450 nm or less, wherein said carbon black has an average primary particle diameter of from 10 nm or more to 100 nm or less, and wherein said binder resin is a thermosetting resin or a photosetting resin.

2. The developer carrying member according to claim 1, wherein said carbon black has a DBP oil absorption of from 50 ml/100 g or more to 200 ml/100 g or less.

3. The developer carrying member according to claim 1, wherein said carbon black has a DBP oil absorption of from 50 ml/100 g or more to 150 ml/100 g or less.

4. The developer carrying member according to claim 1, wherein said resin coat layer has, in its X-ray diffraction chart obtained by measurement by X-ray diffraction, a main peak in the range of from 25.46° or more to 26.67° or less in the X-ray diffraction pattern 2θ.

5. The developer carrying member according to claim 4, wherein the whole region of a half width of said main peak is in the range of from 25.09° or more to 27.04° or less.

6. The developer carrying member according to claim 1, wherein said resin coat layer has, in its X-ray diffraction chart obtained by measurement by X-ray diffraction, at least one peak in each of the range of from 25.84° or more to 26.46° or less and the range of from 25.46° or more to 25.84° or less in the X-ray diffraction pattern 2θ.

7. A developing assembly which comprises the developer carrying member according to claim 1.

* * * * *